United States Patent
Todo et al.

(10) Patent No.: US 7,916,994 B2
(45) Date of Patent: Mar. 29, 2011

(54) SIGNAL PROCESSING APPARATUS

(75) Inventors: Shin Todo, Tokyo (JP); Haruo Togashi, Kanagawa (JP); Akira Sugiyama, Kanagawa (JP); Hideyuki Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 556 days.

(21) Appl. No.: 10/219,409

(22) Filed: Aug. 15, 2002

(65) Prior Publication Data

US 2003/0059201 A1 Mar. 27, 2003

(30) Foreign Application Priority Data

Aug. 16, 2001 (JP) ................................. 2001-247299

(51) Int. Cl.
*H04N 5/91* (2006.01)
(52) U.S. Cl. ................ 386/46; 386/45; 386/95; 386/96; 386/126
(58) Field of Classification Search .................... 386/45, 386/95, 94, 96, 68, 109, 81, 2–3, 6–7, 124, 386/125, 126, 110; 360/60, 201; 380/201; 375/240, 240.23, 240.25, 240.27; 382/246
See application file for complete search history.

(56) References Cited

U.S. PATENT DOCUMENTS

| | | | | |
|---|---|---|---|---|
| 5,442,400 A * | 8/1995 | Sun et al. | ................ | 375/240.15 |
| 5,657,423 A * | 8/1997 | Benbassat et al. | ............ | 704/230 |
| 5,686,965 A * | 11/1997 | Auld | ........................ | 375/240.01 |
| 5,778,191 A * | 7/1998 | Levine et al. | .................. | 709/247 |
| 5,781,690 A * | 7/1998 | Juri et al. | ........................ | 386/111 |
| 5,852,706 A * | 12/1998 | Ogikubo et al. | .............. | 386/111 |
| 5,963,596 A * | 10/1999 | Benbassat et al. | ............ | 375/243 |
| 6,088,342 A * | 7/2000 | Cheng et al. | .................... | 370/320 |
| 6,516,034 B2 * | 2/2003 | Todo et al. | ................ | 375/240.25 |
| 6,721,492 B1 * | 4/2004 | Togashi | ........................ | 386/109 |
| 6,760,539 B2 * | 7/2004 | Asada et al. | ...................... | 386/94 |
| 6,782,190 B1 * | 8/2004 | Morito | ............................. | 386/94 |
| 6,819,865 B2 * | 11/2004 | Ando et al. | ....................... | 386/95 |
| 6,829,299 B1 * | 12/2004 | Chujoh et al. | ................ | 375/240 |
| 6,836,844 B1 * | 12/2004 | Kori et al. | ...................... | 713/176 |
| 7,127,156 B1 * | 10/2006 | Togashi et al. | ................ | 386/112 |
| 7,203,239 B2 * | 4/2007 | Chujoh et al. | ............ | 375/240.23 |
| 2002/0114397 A1 * | 8/2002 | Todo et al. | ............... | 375/240.29 |

FOREIGN PATENT DOCUMENTS

GB 2 341 509 3/2000

* cited by examiner

*Primary Examiner* — Jamie Atala
(74) *Attorney, Agent, or Firm* — Frommer Lawrence & Haug LLP; William S. Frommer; Thomas F. Presson

(57) ABSTRACT

When a stream encoded with a variable length code is output, a stream containing a syntax error and a format violation is prevented from being output.
A checker checks encoding parameter for a stream that is reproduced from a magnetic tape and a stream that is output through an EE path and determines an occurrence of a syntax error or a format violation. When the output stream contains it, a switch circuit stops outputting the stream in the unit of a GOP or a picture and adds a code representing the end to the immediately preceding stream. The checker continuously checks the stream. When the output stream does not contain an error, etc, the output of the stream is resumed from the beginning of a GOP. At that point, flag representing that there is a picture that has not been used due to the stop of the stream is added.

21 Claims, 35 Drawing Sheets

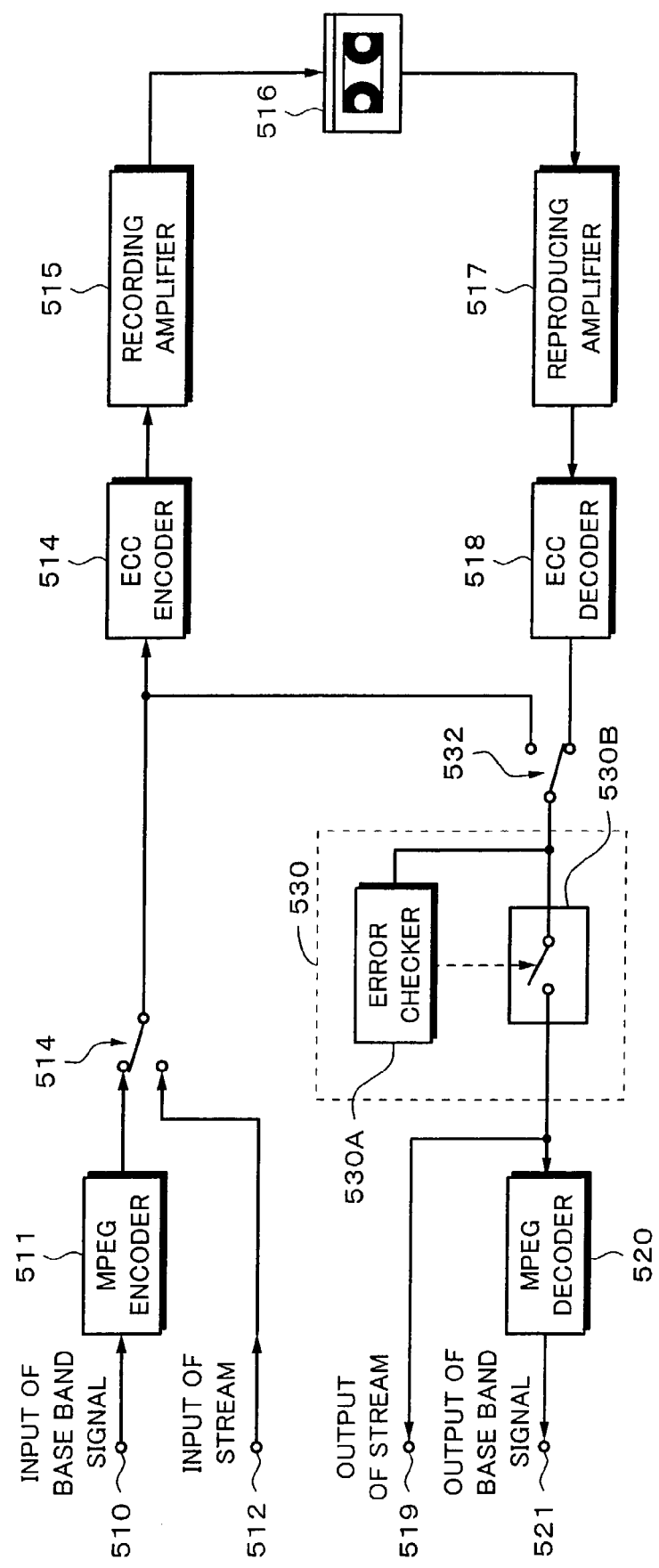

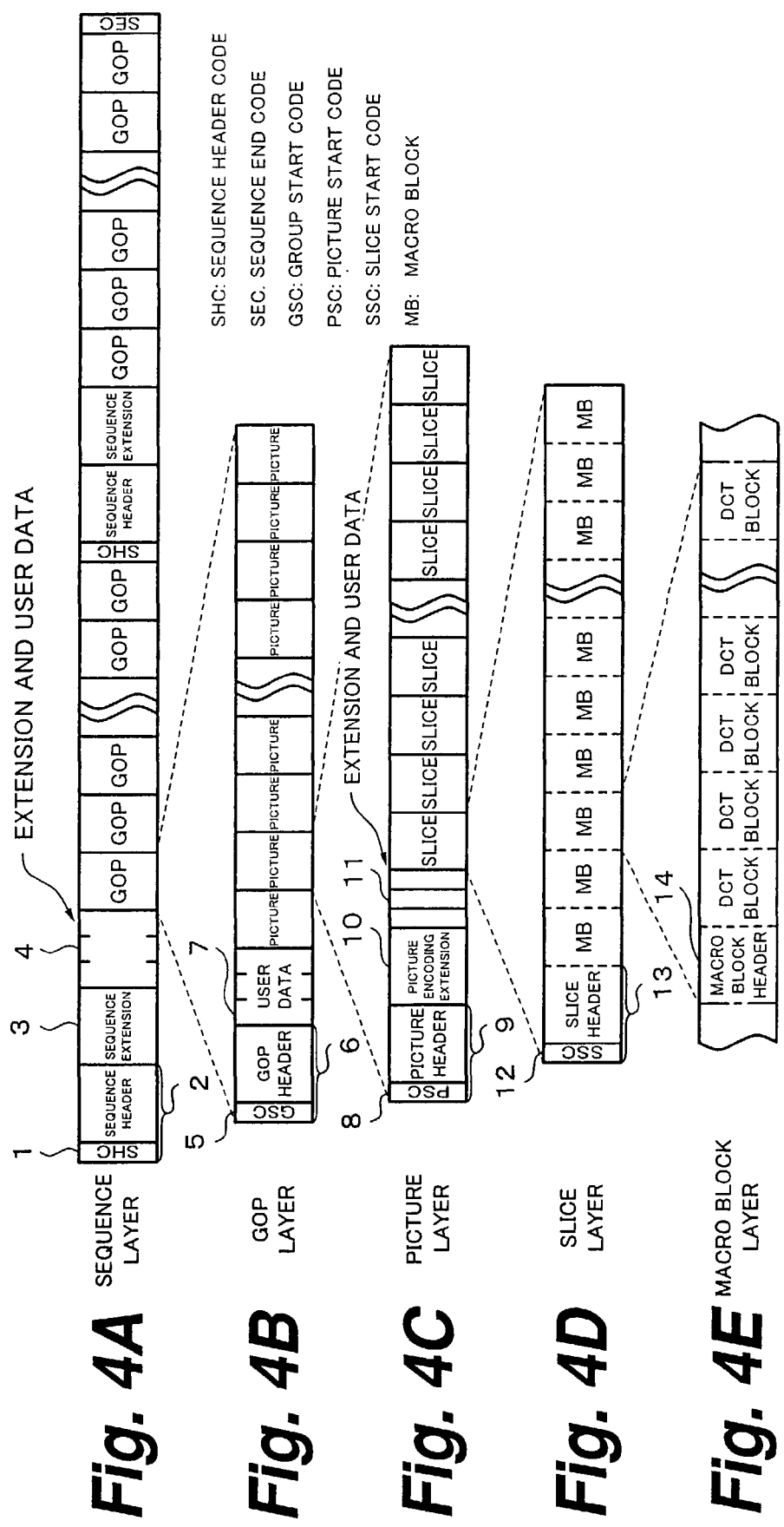

Fig. 5

| CODE NAME | NUMBER OF BITS | CONTENT |
|---|---|---|
| sequence header code | 32 | SEQUENCE HEADER CODE |
| horizontal size value | 12 | LOW ORDER 12 BITS OF NUMBER OF PIXELS IN HORIZONTAL DIRECTION |
| vertical size value | 12 | LOW ORDER 12 BITS OF NUMBER OF LINES IN VERTICAL DIRECTION |
| aspect ratio information | 4 | PIXEL ASPECT RATIO INFORMATION |
| frame rate code | 4 | FRAME RATE CODE |
| bit rate value | 18 | LOW ORDER 18 BITS OF BIT RATE (INDICATED IN THE UNIT OF 400 BITS) |
| vbv buffer size value | 10 | LOW ORDER 10 BITS OF VBV BUFFER SIZE |
| intra quantiser matrix [64] | 8*64 | QUANTIZER MATRIX VALUE FOR INTRA MB |
| non intra quantiser matrix [64] | 8*64 | QUANTIZER MATRIX VALUE FOR NON-INTRA MB |

Fig. 6

| CODE NAME | NUMBER OF BITS | CONTENT |
|---|---|---|
| profile and level indication | 8 | PROFILE, LEVEL |
| progressive sequence | 1 | PROGRESSIVE PICTURE FLAG OF ENTIRE SEQUENCE |
| chroma format | 2 | CHROMA FORMAT |
| low delay | 1 | LOW DELAY MODE (WITHOUT B PICTURE) |

Fig. 7

| CODE NAME | NUMBER OF BITS | CONTENT |
|---|---|---|
| extension data (0) | | EXTENSION DATA (0) |
| sequence display extension ( ) | | SEQUENCE DISPLAY ( ) |
| sequence scalable extension ( ) | | SEQUENCE SCALABLE EXTENSION ( ) |
| extension start code identifier | 4 | SEQUENCE SCALABLE EXTENSION ID |
| scalable mode | 2 | SCALABILITY MODE |
| layer id | 4 | LAYER ID OF SCALABLE HIERARCHY |
| IN THE CASE OF SPATIAL SCALABILITY | | |
| lower layer prediction horizontal size | 14 | HORIZONTAL SIZE OF PREDICTIVE LOWER LAYER |
| lower layer prediction vertical size | 14 | VERTICAL SIZE OF PREDICTIVE LOWER LAYER |
| vertical subsampling factor n | 5 | UP-SAMPLE DIVISOR IN VERTICAL DIRECTION |
| IN THE CASE OF TEMPORAL SCALABILITY | | |
| picture mux order | 3 | NUMBER OF PICTURES OF ADDITIONAL LAYER BEFORE FIRST BASE LAYER PICTURE |
| picture mux factor | 3 | NUMBER OF PICTURES OF ADDITIONAL LAYER BETWEEN BASE LAYERS |
| user data ( ) | | USER DATA ( ) |
| user data | 8 | USER DATA |

Fig. 8

| CODE NAME | NUMBER OF BITS | CONTENT |
|---|---|---|
| group start code | 32 | GOP START CODE |
| time code | 25 | TIME CODE (HOUR, MINUTE, SECOND, PICTURE) |
| closed gop | 1 | FLAG REPRESENTING INDEPENDENCY OF GOP |
| broken link | 1 | VALIDITY FLAG OF B PICTURE FOLLOWED BY I PICTURE OF GOP |

Fig. 9

| CODE NAME | NUMBER OF BITS | CONTENT |
|---|---|---|
| extension data (1) | | EXTENSION DATA (1) |
| user data ( ) | | USER DATA ( ) |
| user data | 8 | USER DATA |

Fig. 10

| CODE NAME | NUMBER OF BITS | CONTENT |
|---|---|---|
| picture start code | 32 | PICTURE START CODE |
| temporal reference | 10 | DISPLAY SEQUENCE OF PICTURES OF GOP (MODULO 1024) |
| picture coding type | 3 | PICTURE CODING TYPE (I, B, P) |
| vbv delay | 16 | VBV DELAY AMOUNT UNTIL DECODING IS STARTED |

Fig. 11

| CODE NAME | NUMBER OF BITS | CONTENT |
|---|---|---|
| f code [s][t] | 4*4 | RANGE OF MOVING VECTOR IN FORWARD AND BACKWARD DIRECTIONS (s) AND HORIZONTAL AND VERTICAL DIRECTIONS (t) |
| intra dc precision | 2 | ACCURACY OF DC COEFFICIENT OF INTRA MB |
| picture structure | 2 | PICTURE STRUCTURE (FRAME, FIELD) |
| top field first | 1 | DESIGNATION OF DISPLAY FIELD |
| frame pred frame dct | 1 | FRAME PREDICTION + FRAME DCT FLAG |
| concealment motion vectors | 1 | INTRA MB CONCEALMENT MV FLAG |
| q scale type | 1 | QUANTIZER SCALE TYPE (LINEAR, NON-LINEAR) |
| intra vlc format | 1 | VLC TYPE OF INTRA MB |
| alternate scan | 1 | SCANNING TYPE (ZIGZAG, ALTERNATE) |
| repeat first field | 1 | 2 : 3 PULL-DOWN FIELD REPEAT |
| chroma 420 type | 1 | SAME VALUE AS THAT OF PROGRESSIVE FRAME IN 4 : 2 : 0 |
| progressive frame | 1 | PROGRESSIVE FRAME FLAG |

Fig. 12

| CODE NAME | NUMBER OF BITS | CONTENT |
|---|---|---|
| extension data (2) | | EXTENSION DATA (2) |
| quant matrix extension ( ) | | QUANTIZER MATRIX EXTENSION ( ) |
| intra quantiser matrix [64] | 8 * 64 | INTRA MB QUANTIZER MATRIX |
| non intra quantiser matrix [64] | 8 * 64 | NON-INTRA MB QUANTIZER MATRIX |
| chroma intra quantiser matrix [64] | 8 * 64 | CHROMA INTRA QUANTIZER MATRIX |
| chroma non intra quantiser matrix [64] | 8 * 64 | CHROMA NON-INTRA QUANTIZER MATRIX |
| copyright extension ( ) | | COPYRIGHT EXTENSION ( ) |
| picture display extension ( ) | | PICTURE DISPLAY EXTENSION ( ) |
| picture spatial scalable extension ( ) | | PICTURE SPATIAL SCALABLE EXTENSION ( ) |
| spatial temporal weight code table index | 2 | UP-SAMPLE SPATIAL AND TEMPORAL WEIGHTING TABLE |
| lower layer progressive frame | 1 | LOWER LAYER PROGRESSIVE PICTURE FLAG |
| lower layer deinterlaced field select | 1 | FIELD SELECTION OF LOWER LAYER |
| picture temporal scalable extension ( ) | | PICTURE TEMPORAL SCALABLE EXTENSION ( ) |
| reference select code | 2 | SELECTION OF REFERENCE SCREEN |
| forward temporal reference | 10 | PICTURE NUMBER OF FORWARD PREDICTIVE LOWER LAYER |
| backward temporal reference | 10 | PICTURE NUMBER OF BACKWARD PREDICTIVE LOWER LAYER |
| user data ( ) | | USER DATA ( ) |
| user data ( ) | 8 | USER DATA |

Fig. 13

| CODE NAME | NUMBER OF BITS | CONTENT |
|---|---|---|
| slice start code | 32 | SLICE START CODE + SLICE VERTICAL POSITION |
| slice vertical position extension | 3 | SLICE VERTICAL POSITION EXTENSION ( > 2800 LINES ) |
| priority breakpoint | 7 | DATA PARTITIONING BREAKPOINT |
| quantiser scale code | 5 | QUANTIZER SCALE CODE (1 TO 31) |
| intra slice | 1 | INTRA SLICE FLAG |
| macroblock ( ) | | MACRO BLOCK DATA ( ) |

Fig. 14

| CODE NAME | NUMBER OF BITS | CONTENT |
|---|---|---|
| macroblock escape | 11 | MB ADDRESS EXTENSION (>33) |
| macroblock address increment | 1-11 | DIFFERENCE BETWEEN ADDRESS OF CURRENT MB AND ADDRESS OF PRECEDING MB |
| macroblock modes ( ) | | MACRO BLOCK MODE ( ) |
| macroblock type | 1-9 | MB ENCODE TYPE (MC, CODED, ETC) |
| spatial temporal weight code | 2 | UP-SAMPLE TEMPORAL AND SPATIAL WEIGHTING CODE |
| frame motion type | 2 | MOTION COMPENSATION TYPE OF FRAME STRUCTURE |
| field motion type | 2 | MOTION COMPENSATION TYPE OF FIELD STRUCTURE |
| dct type | 1 | DCT TYPE (FRAME, FIELD) |
| quantiser scale code | 5 | MB QUANTIZER SCALE CODE (1 TO 31) |
| motion vectors (s) | | MOVING VECTOR (s) |
| motion vertical field select [r][s] | 1 | SELECTION OF REFERENCE FIELD USED FOR PREDICTION |
| motion vector (r, s) | | MOVING VECTOR (r, s) |
| motion code [r][s][t] | 1-11 | BASIC DIFFERENTIAL MOVING VECTOR |
| motion residual [r][s][t] | 1-8 | RESIDUAL VECTOR |
| dmvector [t] | 1-2 | DUAL PRIME DIFFERENTIAL VECTOR |
| coded block pattern ( ) | | CBP |
| block (i) | | BLOCK DATA ( ) |

Fig. 15

| CODE NAME | NUMBER OF BITS | CONTENT |
|---|---|---|
| dct dc size luminance | 2-9 | DCT LUMINANCE DC COEFFICIENT DIFFERENCE SIZE |
| dct dc differential | 1-11 | DCT LUMINANCE DC COEFFICIENT DIFFERENCE VALUE |
| dct dc size chrominance | 2-10 | DCT CHROMINANCE DC COEFFICIENT DIFFERENCE SIZE |
| dct dc differential | 1-11 | DCT CHROMINANCE DC COEFFICIENT DIFFERENCE VALUE |
| First DCT coefficient | 3-24 | FIRST NON-ZERO COEFFICIENT OF NON-INTRA BLOCK |
| Subsequent DCT coefficient | 2-24 | SUBSEQUENT DCT COEFFICIENT |
| End of block | 2 or 4 | DCT COEFFICIENT END FLAG IN BLOCK |

Fig. 16A

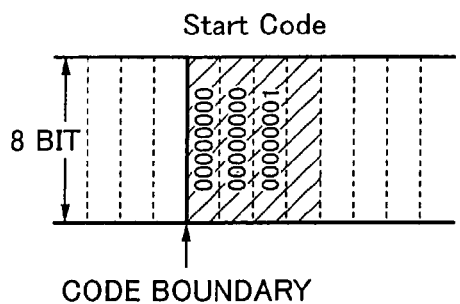

Fig. 16B

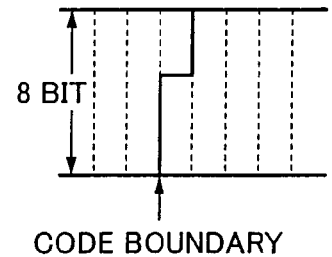

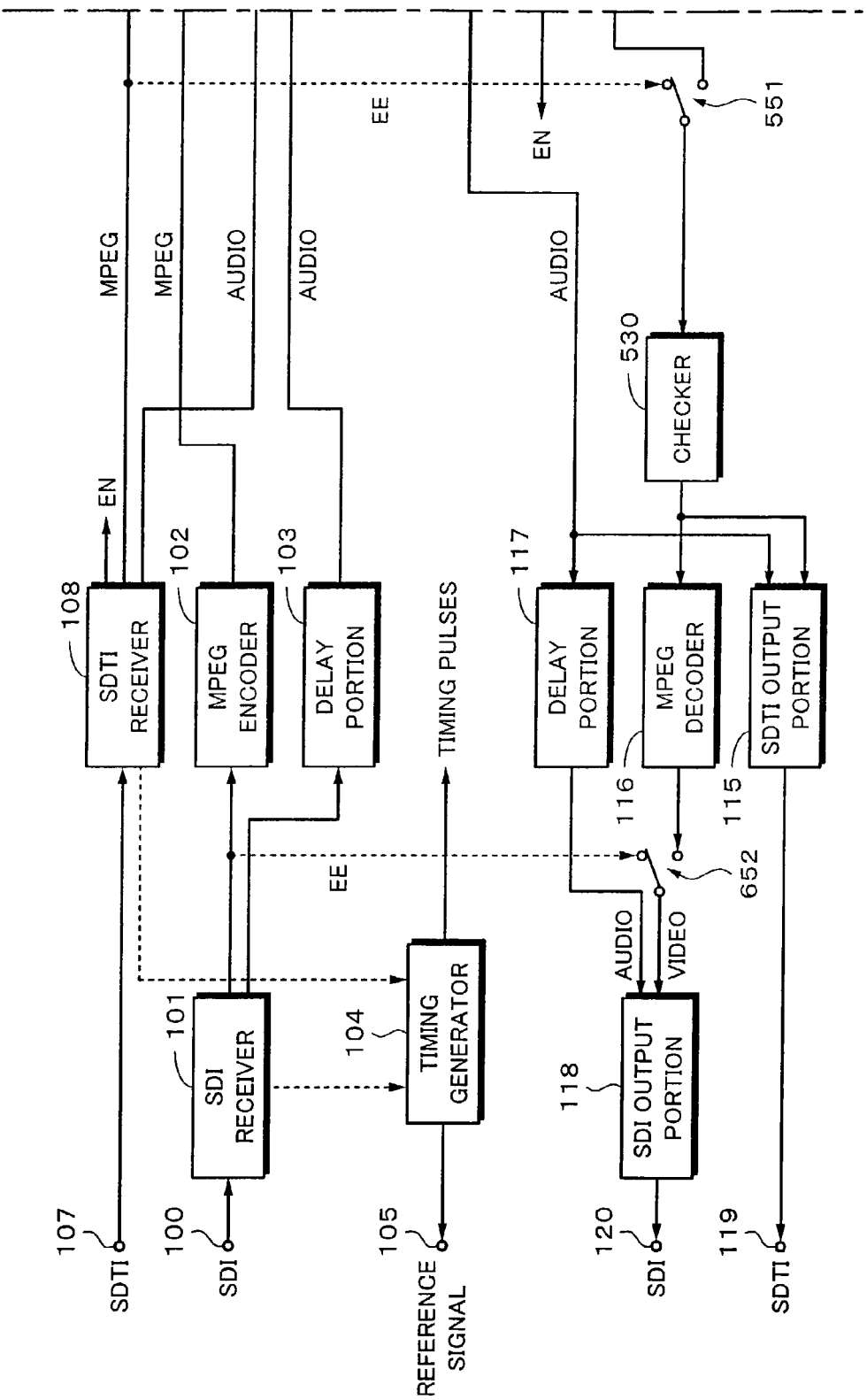

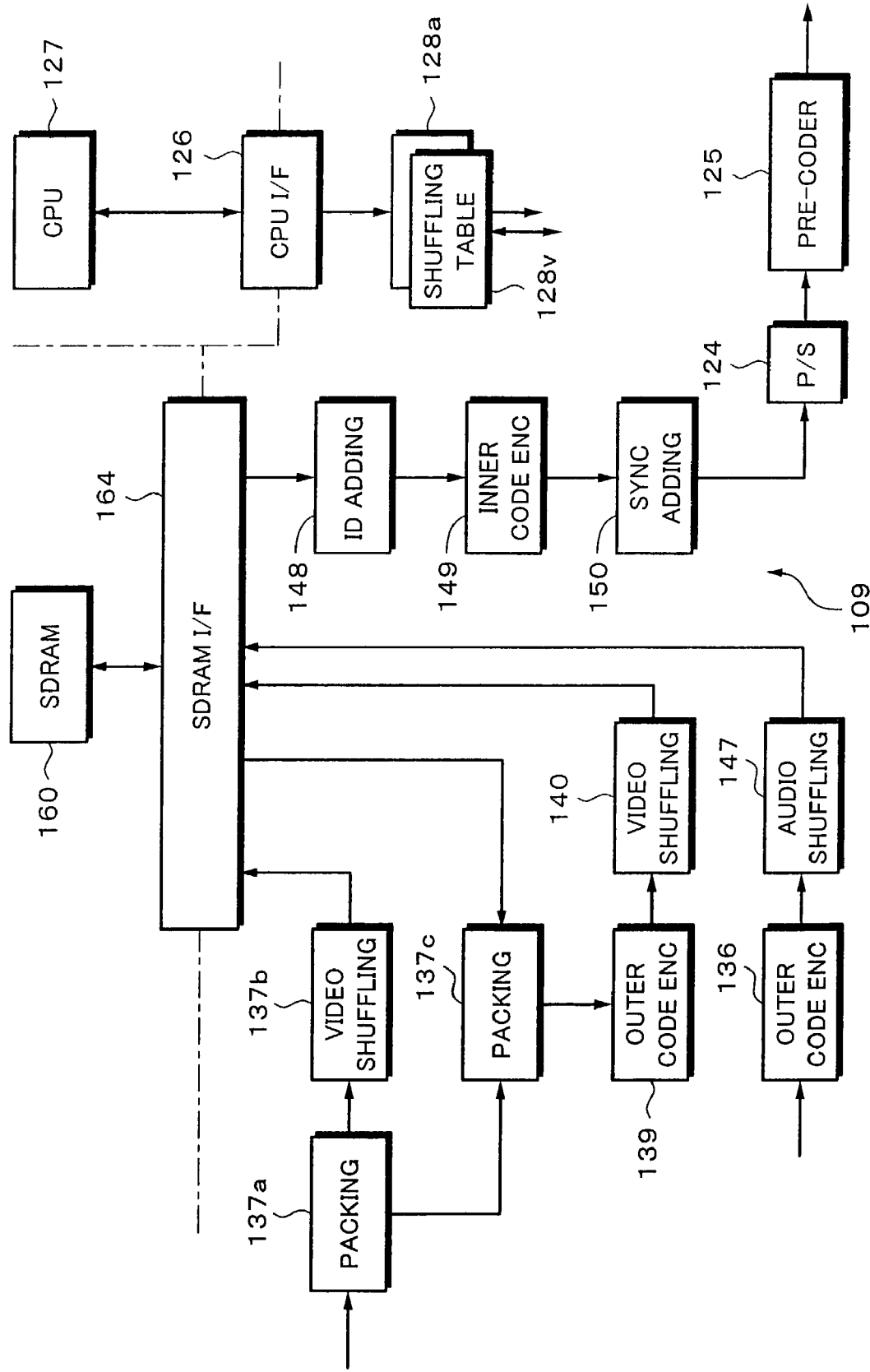

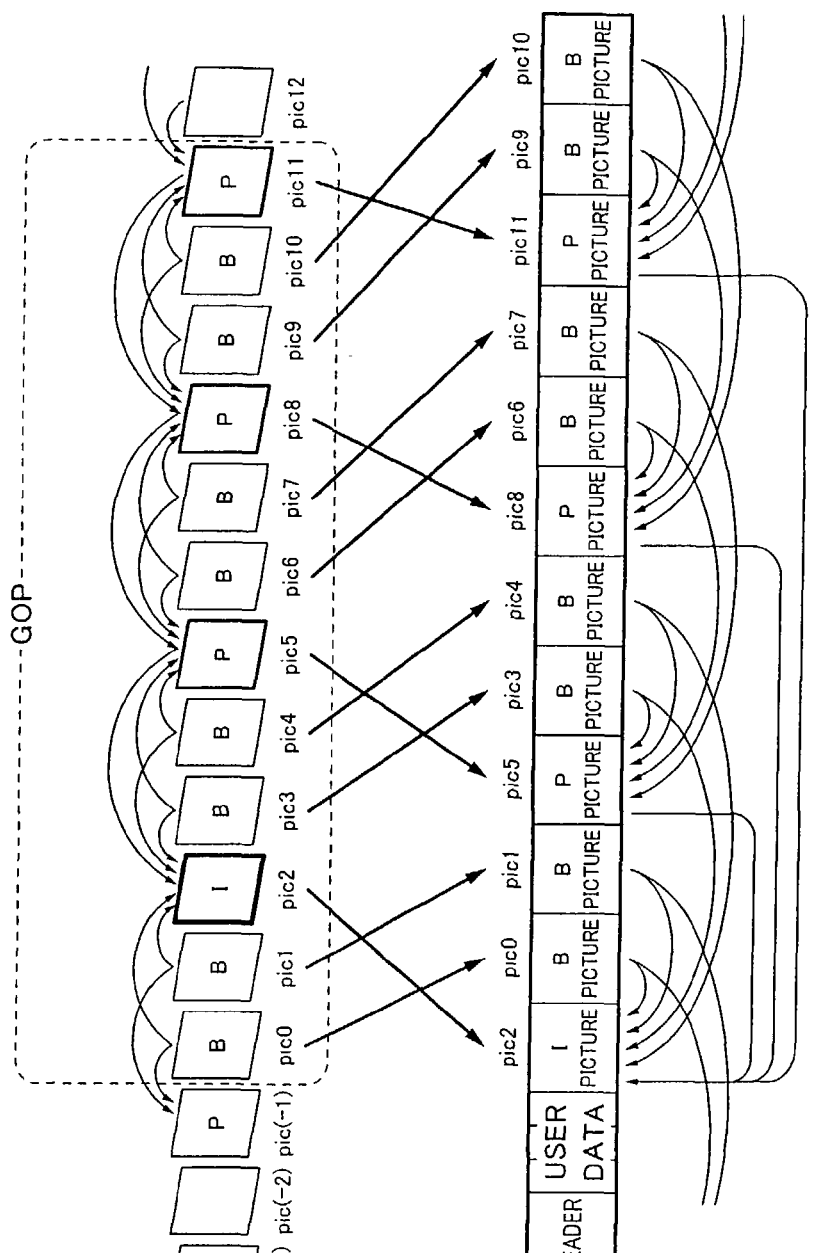

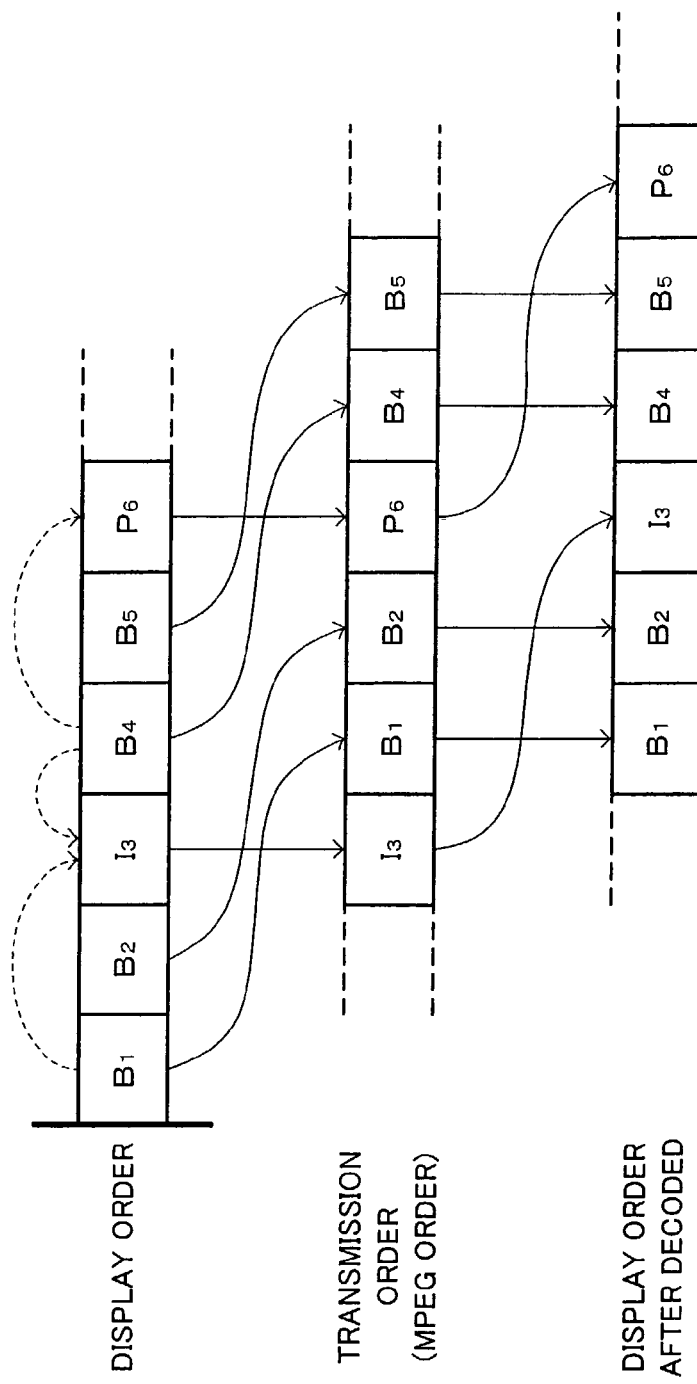

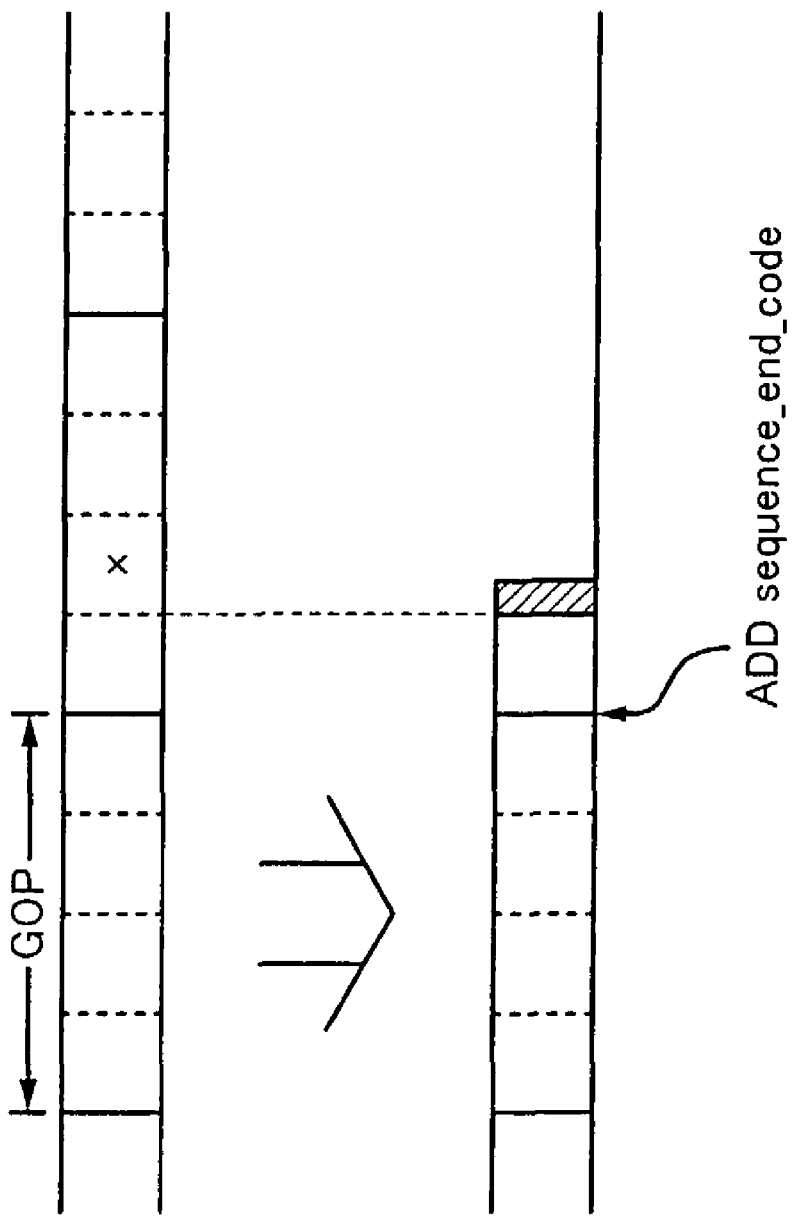

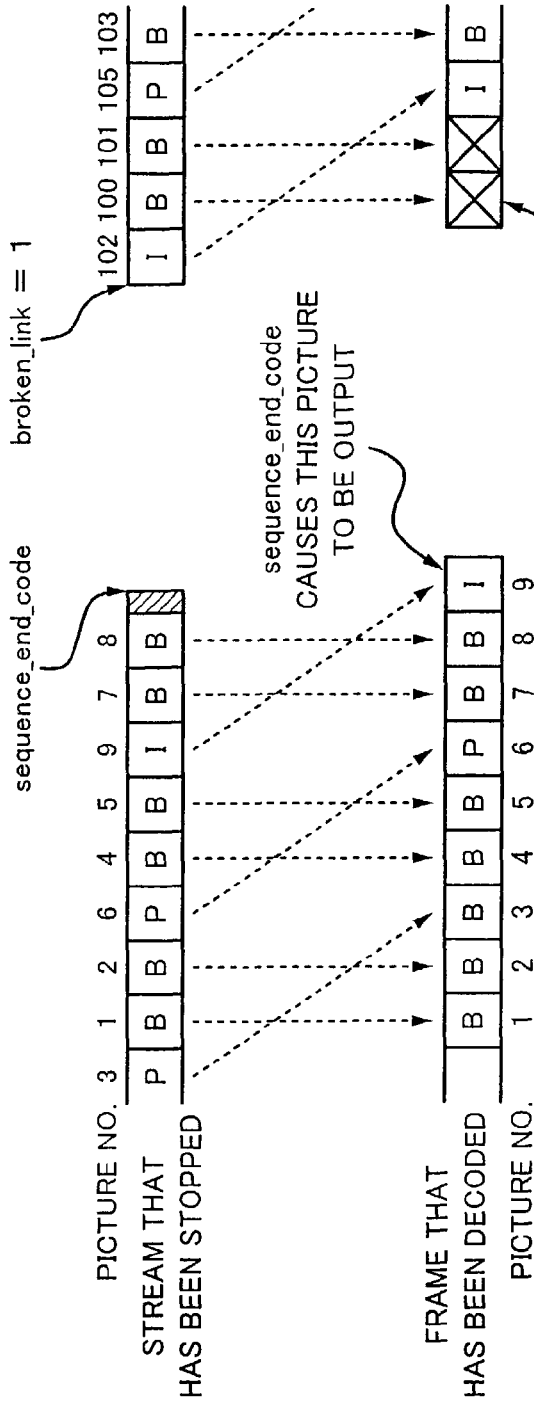

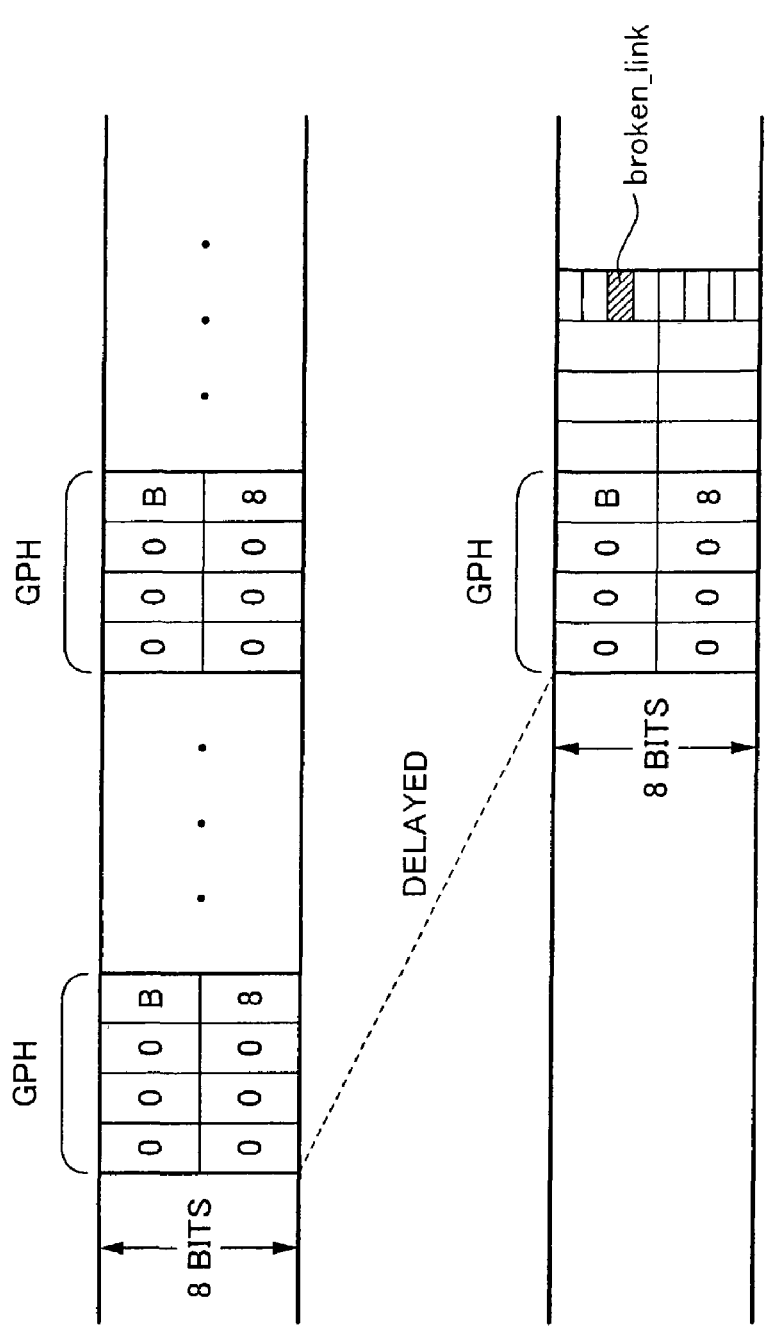

SIGNAL PROCESSING APPARATUS

BACKGROUND OF THE INVENTION

1. Field of the Invention

The present invention relates to a signal processing apparatus that allows a stream that has been recorded as a variable length code on a record medium not to be output when the stream contains a syntax error or a format violation.

2. Description of the Related Art

As represented by a digital VCR (Video Cassette Recorder), a data recording and reproducing apparatus that records a digital video signal and a digital audio signal to a record medium and that reproduces them therefrom is known. Since the data capacity of a digital video signal is huge, it is normally compressed and encoded before it is recorded on the record medium. In recent years, the MPEG2 (Moving Picture Experts Group 2) system is known as a standard compressing and encoding system.

In picture compression technologies including the foregoing MPEG2 system, the data compression rate is improved using a variable length code. Thus, depending on the complexity of a picture to be compressed, the code amount of one screen (for example, one frame or one field) that has been compressed varies.

The forgoing MPEG2 system has a hierarchical structure composed of a macro block layer, a slice layer, a picture layer, a GOP layer, and a sequence layer disposed in the order from the bottom to the top. In the hierarchical structure, the slice layer is a unit of a variable length code encoding process. The macro block layer is composed of a plurality of DCT (Discrete Cosine Transform) blocks. At the beginning of each layer, a header portion that stores header information is disposed. For example, in the slice layer, by detecting the header portion, the delimitation position of a variable length code is detected. A decoder decodes a variable length code corresponding to the detected delimitation positions thereof.

In the MPEG2 system, a data array prescribed thereby is referred to as syntax.

On the other hand, there are many video data formats in combination of a picture size, a frame frequency, a scanning method, and so forth. Generally, video apparatuses used in a broadcasting station and those used by professional users can deal with limited video data formats. The forgoing MPEG2 standard is designed to flexibly deal with various video formats.

In recent years, a recording apparatus that inputs a video signal as a non-compressed base band signal and compresses and encodes the video signal with a variable length code corresponding to MPEG2 system or JPEG (Joint Photographic Experts Group) system is known.

Next, the case that a stream that contains an syntax error or a format violation is output to such an apparatus will be considered. The output stream is supplied to another video signal processing apparatus or the like. For example, the stream is input to a decoder. The decoder decodes a variable length code. When an invalid data stream (namely, a data stream that contains a syntax error) is input to a decoder of a system that uses a variable length code (for example, an MPEG2 decoder), the decoder cannot decode the data stream that has been input.

As a first reason, a variable length code cannot be decoded. Unless a code that has a solution (decoded result) against all codes (a combination of "1s" and "0s" or a fixed length code is used, there is a possibility of which a code sequence cannot be decoded. For example, in the case of the MPEG2 system, as was described above, although a slice is one code sequence, after the position at which an invalid stream is placed in the slice, the remaining slice may not be decoded.

As a second reason, even if a variable length code sequence can be decoded, the decoded data becomes invalid or contradictory. For example, when an error enters a system that uses a code that has a solution against all codes, although some data is decoded, the content of the decoded data becomes meaningless.

As with the MPEG2 system, even if a code that has a solution against all codes is not used, when an invalid variable length code sequence may accidentally match another code that has a different meaning therefrom, the code sequence may be decoded. In this case, there is a high possibility of which decoded data contains inconsistency or invalidity.

For example, in the MPEG2 system, a DCT block may contain 65 elements instead of 64 elements; the number of DCT blocks in a macro block does not match a predetermined value; the number of macro blocks in a slice does not match a predetermined value; control may be jumped to a prohibited macro block address; control may be jumped in the reverse direction; or control may be jumped to an address that is out of the range of the system.

In a video system, a syntax error tends to disorder a decoded picture. Generally, in a system using a variable length code, a syntax error may cause the decoder to hang up.

Such a syntax error does not takes place in a special situation. Instead, in a reproducing apparatus, when a signal path is switched from a reproduction monitor system to an EE system (Electric to Electric) (input monitor system) that is a bypass route, there is a possibility of which such a syntax error takes place.

Especially, when an apparatus used in a broadcasting station hangs up due to such ordinary reasons, it is fatal to the broadcasting station. In addition, the apparatus synchronizes with external apparatuses, the situation adversely affects them.

On the other hand, since computers and data recorders treat video data as a simple data sequence, even if video data that does not comply with the standard is input, such a fatal situation does not take place. However, all digital VCRs cannot deal with JPEG and MPEG data streams. In other words, as was described above, the MPEG2 standard is designed to deal with various video formats. Thus, corresponding to the applications, various formats are designated to the digital video apparatus in such a manner that combinations of picture sizes and frame frequencies are limited corresponding to the broadcasting system, that a picture encoding type is fixed to edit video data in the unit of a frame, that a slice structure is limited to allow a picture search as a high speed reproduction, and so forth.

When such a format has been designated to the apparatus, even if a data stream complies with a JPEG or MPEG syntax, when the stream does not comply with the designated format, the apparatus cannot process the stream. Rather, when a data stream that does not comply with the format designated to the apparatus is input thereto, as with the case of the forgoing syntax error, there is a probability of which pictures of the apparatus and other apparatuses connected thereto are disordered, the system loses synchronization, system delay deviates, or the system hangs up.

Thus, when a stream that contains a syntax error or a format violation is output to an apparatus, there is a possibility of which the apparatus faces a serious problem.

OBJECTS AND SUMMARY OF THE INVENTION

Therefore, an object of the present invention is to provide a signal processing apparatus that allows a stream that has been encoded with variable length codes to be output without a syntax error or a format violation.

A first aspect of the present invention is a signal processing apparatus that outputs an encoded stream to the outside of the apparatus, comprising an output means for outputting an encoded stream to the outside of the apparatus, an extracting means for extracting a parameter with respect to an encoding process from the encoded stream supplied to the output means, a determining means for determining whether or not the parameter extracted by the extracting means is an invalid-parameter, and an output stopping means for causing the output means to stop outputting the encoded stream when the determined result of the determining means represents that the parameter is an invalid parameter.

A second aspect of the present invention is a signal processing method for outputting an encoded stream to the outside, comprising the steps of extracting a parameter with respect to an encoding process from an encoded stream that are output and supplied, determining whether or not the parameter extracted at the extracting step is an invalid parameter, and causing the output of the encoded stream to be stopped when the determined result at the determining step represents that the parameter is an invalid parameter.

A third aspect of the present invention is a recording and reproducing apparatus that records an input stream that has been encoded outside the apparatus to a record medium and outputs a stream that has been encoded and reproduced from a record medium to the outside the apparatus, comprising an input means for inputting a stream that has been encoded outside the apparatus, a recording means for recording the encoded stream that has been input to the input means to a record medium, a reproducing means for reproducing an encoded stream from the record medium, an output means for outputting the encoded stream reproduced by the reproducing means to the outside of the apparatus, an extracting means for extracting a parameter with respect to an encoding process from the encoded stream supplied to the output means, a determining means for determining whether or not the parameter extracted by the extracting means is an invalid parameter, and an output stopping means for causing the output means to stop outputting the encoded stream when the determined result of the determining means represents that the parameter is an invalid parameter.

A fourth aspect of the present invention is a reproducing apparatus that reproduces an encoded stream from a record medium and outputs the reproduced encoded stream to the outside of the apparatus, comprising a reproducing means for reproducing an encoded stream from a record medium, an output means for outputting the encoded stream reproduced by the reproducing means to the outside of the apparatus, an extracting means for extracting a parameter with respect to an encoding process from the encoded stream supplied to the output means, a determining means for determining whether or not the parameter extracted by the extracting means is an invalid parameter, and an output stopping means for causing the output means to stop outputting the encoded stream when the determined result of the determining means represents that the parameter is an invalid parameter.

A fifth aspect of the present invention is a reproducing method for reproducing an encoded stream from a record medium and outputting the reproduced encoded stream to the outside, comprising the steps of reproducing an encoded stream from a record medium, extracting a parameter with respect to an encoding process from the encoded stream that has been reproduced, determining whether or not the parameter extracted at the extracting step is an invalid parameter, and causing the output of the encoded stream to be stopped when the determined result at the determining step represents that the parameter is an invalid parameter.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a block diagram showing the fundamental structure of a VCR according to the present invention;

FIGS. 4A, 4B, 4C, 4D and 4E are schematic diagrams showing an outlined hierarchical structure of MPEG2 data;

FIG. 5 is a schematic diagram showing the content of data placed in an MPEG2 stream and a bit assignment thereof;

FIG. 6 is a schematic diagram showing the content of data placed in an MPEG2 stream and a bit assignment thereof;

FIG. 7 is a schematic diagram showing the content of data placed in an MPEG2 stream and a bit assignment thereof;

FIG. 8 is a schematic diagram showing the content of data placed in an MPEG2 stream and a bit assignment thereof;

FIG. 9 is a schematic diagram showing the content of data placed in an MPEG2 stream and a bit assignment thereof;

FIG. 10 is a schematic diagram showing the content of data placed in an MPEG2 stream and a bit assignment thereof;

FIG. 11 is a schematic diagram showing the content of data placed in an MPEG2 stream and a bit assignment thereof;

FIG. 12 is a schematic diagram showing the content of data placed in an MPEG2 stream and a bit assignment thereof;

FIG. 13 is a schematic diagram showing the content of data placed in an MPEG2 stream and a bit assignment thereof;

FIG. 14 is a schematic diagram showing the content of data placed in an MPEG2 stream and a bit assignment thereof;

FIG. 15 is a schematic diagram showing the content of data placed in an MPEG2 stream and a bit assignment thereof;

FIGS. 16A and 16B are schematic diagrams for explaining a byte assigned arrangement of data;

FIG. 23 is a block diagram showing a more practical structure of an ECC encoder;

FIGS. 28A and 28B are schematic diagrams for explaining the order of pictures of an MPEG stream;

FIGS. 29A, 29B, and 29C are schematic diagrams showing the order of pictures in the case that the beginning of a GOP is encoded and decoded;

FIGS. 32A and 32B are schematic diagrams for explaining the case that a process is performed in the unit of a picture;

FIGS. 33A, 33B, and 33C are schematic diagrams showing an example of the case that a P picture contains a syntax error or a format violation;

FIGS. 38A and 38B are schematic diagrams for explaining a designation of broken_link.

DETAILED DESCRIPTION OF THE PREFERRED EMBODIMENTS

Figure 1:
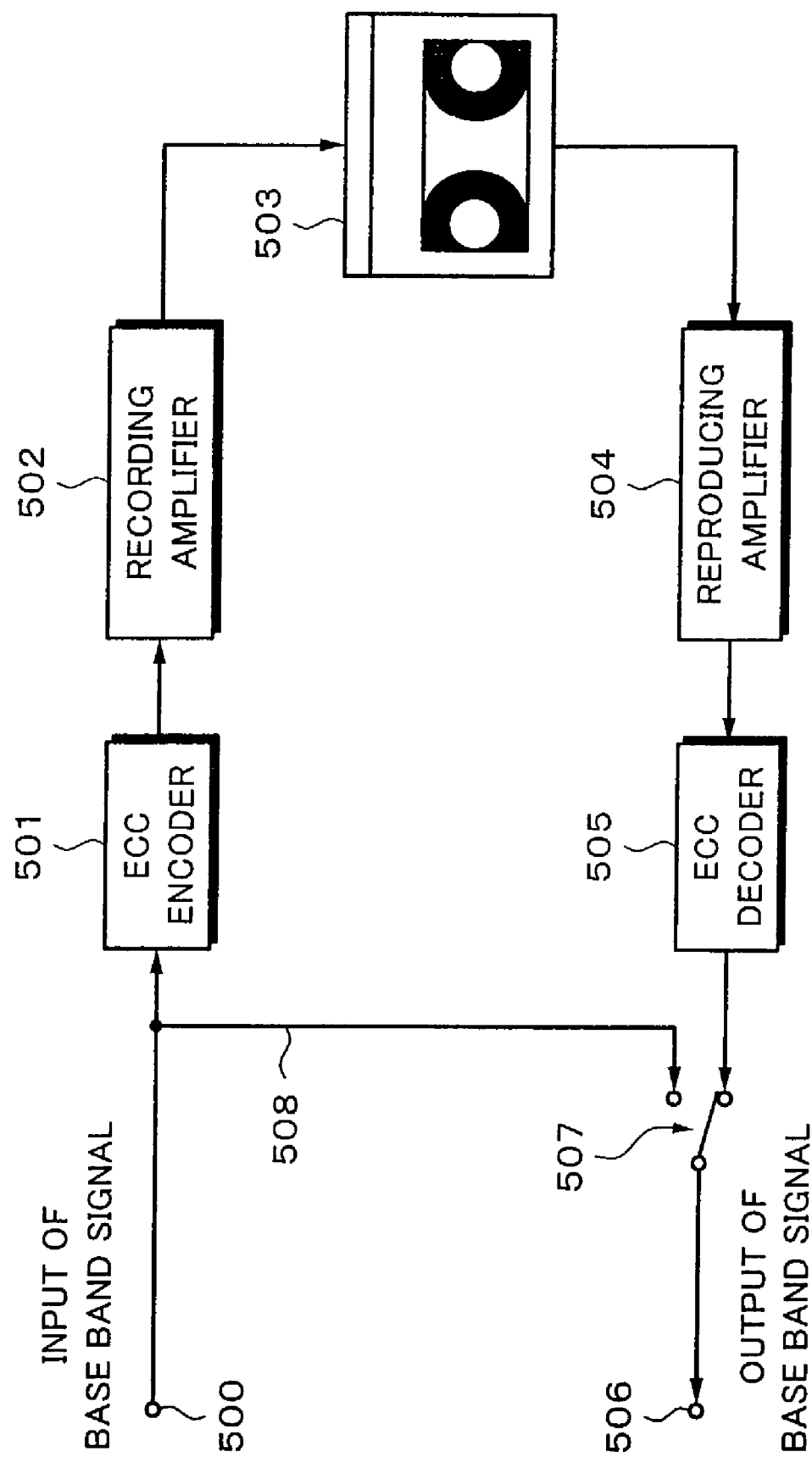
FIG. 1 is a block diagram showing a fundamental structure of a VCR that records and reproduces a base band signal to and from a magnetic tape as a record medium.

Next, with reference to FIGS. 1 to 3, the concept of the present invention will be described. FIG. 1 shows a fundamental structure of a digital VCR (Video Cassette Recorder) that records and reproduces a base band signal to and from a magnetic tape as a record medium. When the digital VCR is operated in the recoding mode, a base band signal that is a digital video signal that has not been compressed is input from a terminal 500. The base band signal is supplied to an ECC (Error Correction Coding) encoder 501. In addition, the base band signal is supplied to an EE path 508. The EE path 508 is a monitor path for an input signal. Thereafter, the base band signal is input to a switch circuit 507. The ECC encoder 501 performs a shuffling process and an error correction code encoding process for the supplied base band signal. Thereafter, a recording amplifier 502 encodes the signal supplied from the ECC encoder 501. The recording amplifier 502 supplies the encoded signal to a rotating head (not shown). The rotating head records the encoded signal on a magnetic tape 503.

When the digital VCR is operated in the reproducing mode, a signal is reproduced from the magnetic tape 503 by the rotating head. The reproduced signal is supplied to a reproducing amplifier 504. The reproducing amplifier 504 decodes the reproduced signal into a digital signal. An output signal of the reproducing amplifier 504 is supplied to an ECC decoder 505. The ECC decoder 505 decodes and deshuffles the reproduces signal. The ECC decoder 505 outputs a base band signal. The base band signal is input to the switch circuit 507. The switch circuit 507 selects one of the base band signal that is input from the EE path 508 and the base band signal that is output from the ECC decoder 505. The selected signal is obtained from a terminal 506.

Figure 2:
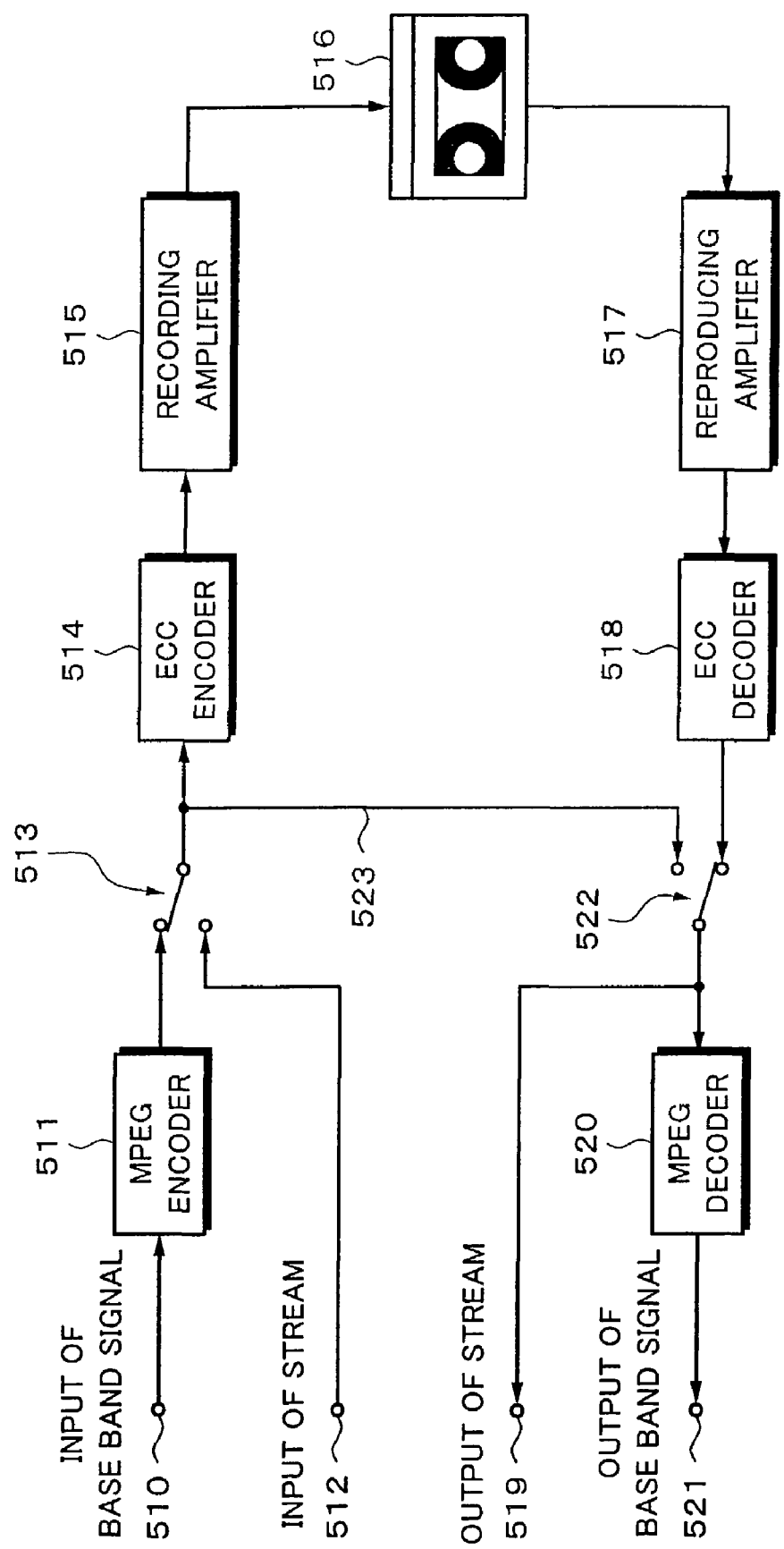
FIG. 2 is a block diagram showing a fundamental structure of a VCR that records and reproduces a stream of which a video signal has been encoded corresponding to the MPEG2 system.

FIG. 2 shows a fundamental structure of a digital VCR that records and reproduces a stream of which a video signal has been encoded corresponding to the MPEG2 system. When the digital VCR is operated in the recording mode, a base band signal is input from a terminal 510. The base band signal is supplied to an MPEG encoder 511. The MPEG encoder 511 encodes the supplied base band signal corresponding to the MPEG2 system and outputs the encoded signal as a stream. The stream that is output from the MPEG encoder 511 is supplied to one input terminal of a selector 513. On the other hand, a stream that has been encoded corresponding to the MPEG2 system is input from a terminal 512. The stream is supplied to the other input terminal of the selector 513.

The selector 513 selects one of the two streams supplied to the input terminals and supplies the selected stream to an ECC encoder 514. An output signal of the selector 513 is supplied to an EE path 523 that is a monitor path for the input signal. Thereafter, the output signal of the selector 513 is input to a switch circuit 522. The ECC encoder 514 performs a shuffling process and an error correction code encoding process for the stream. A recording amplifier 515 encodes the stream and supplies the encoded stream to a rotating head (not shown). The rotating head records the stream on the magnetic tape 516.

When the digital VCR is operated in the reproducing mode, a signal is reproduced from the magnetic tape 516 by the rotating head. The reproduced signal is supplied to a reproducing amplifier 517. The reproducing amplifier 517 decodes the reproduced signal into a digital signal. An output signal of the reproducing amplifier 517 is supplied to an ECC decoder 518. The ECC decoder 518 performs an error correction code decoding process and a deshuffling process for the output signal of the reproducing amplifier 517 and outputs an MPEG2 stream. The output stream of the ECC decoder 518 is input to a switch circuit 522.

The switch circuit 522 selects one of the stream that is input from the EE path 523 and the stream that is output from the ECC decoder 518. The selected stream is directly obtained from a terminal 519. The stream selected by the switch circuit 522 is also supplied to an MPEG decoder 520. The MPEG decoder 520 decodes the supplied stream into a base band signal. The base band signal is obtained from a terminal 521.

When a video signal can be transmitted as a stream between apparatuses, a predetermined number of pictures can be transmitted with a stream whose information amount smaller than a base band signal. When a base band signal is used, whenever it is transmitted, data is expanded and compressed. As a result, the picture quality deteriorates. In contrast, when a stream is used, picture information can be transmitted without a risk of which the picture quality deteriorates. When a picture is not processed, the transmission of a stream is more advantageous than the transmission of a base band signal.

In the structure shown in FIG. 2, even if a stream recorded on the magnetic tape 516 contains a syntax error or a format violation, the ECC decoder 518 normally performs a decoding process. Thus, when the ECC decoder 518 side has been selected by the switch circuit 522, a stream that contains a syntax error or a format violation is output to the terminal 519. Likewise, when a stream that is input to the terminal 512 contains a syntax error or a format violation, if the EE path 523 side has been selected by the switch circuit 522, the stream is output. In addition, when the switch circuit 522 is switched, a stream is broken. At the broken position, there is a possibility of which a syntax error or a format violation takes place.

FIG. 3 shows the fundamental structure of the VCR according to the present invention. For simplicity, in FIG. 3, similar portions to those in FIG. 2 will be denoted by similar reference numerals and their description will be omitted. In comparison with the structure shown in FIG. 2, in the structure shown in FIG. 3, an error checker 530 is added. The error checker 530 determines whether or not the output stream contains a syntax error or a format violation. When the output stream contains a syntax error or a format violation, the error checker 530 stops outputting the stream.

The error checker 530 has a checker 530A and a switch circuit 530B. The checker 530A checks whether or not a stream contains a syntax error or a format violation. Corresponding to the checked result of the checker 530A, the switch circuit 530B adds a predetermined code to the stream. In the structure shown in FIG. 3, a stream that is output from the ECC decoder 518 is supplied to the error checker 530 through a switch circuit 532. The switch circuit 532 selects an output of an EE path 533 or an output of the ECC decoder 518.

The error checker 530 checks whether or not a stream that is input to the checker 530A contains a syntax error or a format violation. When the checked result of the error checker 530 represents that the output stream contains a syntax error or a format violation, the checker 530A causes the switch circuit 530B to be in an open state. As a result, the output of the stream is stopped. At that point, the switch circuit 530B adds sequence_end_code that is a code that represents the end of the sequence to a stream immediately preceded stream. In addition, when the output of the stream is resumed, the switch circuit 530B adds broken_link to the stream that is resumed.

Since a stream that is output from the apparatus to the outside is checked, a stream that contains a syntax error or a format violation can be prevented from being output to the outside of the apparatus.

Next, a digital VCR according to a first embodiment of the present invention will be described. The digital VCR is suitable for use in an environment of a broadcasting station. The VCR according to the first embodiment can record and reproduce video signals in a plurality of different formats.

According to the first embodiment of the present invention, as a compressing system, for example, the MPEG2 system is used. The MPEG2 system uses a combination of a motion compensation prediction encoding process and a DCT compressing and encoding process. MPEG2 data is hierarchically structured. FIGS. 4A, 4B, 4C, and 4E show a hierarchical structure of a regular MPEG2 data stream. As shown in FIGS. 4A to 4E, the MPEG2 data is composed of a macro block layer (FIG. 4E), a slice layer (FIG. 4D), a picture layer (FIG. 4C), a GOP layer (FIG. 4B), and a sequence layer (FIG. 4A) disposed in the order from the lowest layer.

As shown in FIG. 4E, the macro block layer is composed of DCT blocks. For each of DCT blocks, a DCT process is performed. The macro block layer is composed of a macro block header and a plurality of DCT blocks. As shown in FIG. 4D, the slice layer is composed of a slice header portion and at least one macro block. As shown in FIG. 4C, the picture layer is composed of a picture header portion and at least one slice. One picture corresponds to one screen. As shown in FIG. 4B, the GOP layer is composed of a GOP header portion, an I picture, a P picture, and a B picture. An I picture corresponds to intra-frame encoding process. A P picture and a B picture correspond to a predictive encoding process.

When an I picture (Intra-coded picture) is encoded, information of only the picture is used. Thus, when an I picture is decoded, only information thereof is used. When a P picture (Predictive-coded picture) is decoded, an I picture or a P picture that has been decoded as a temporally preceding predictive picture (that is a reference picture for obtaining a difference with the current P picture) is used. The difference between the current P picture and the motion compensated predictive pictures is encoded or the current P picture is encoded whichever effective. One of the two processes is selected for each macro block. When a B picture (Bidirectionally predictive-coded picture) is decoded, as predictive pictures (that are reference pictures for obtaining a difference with the current B picture), three types of pictures that are an I picture or a P picture that has been decoded and that is temporally followed by the current B picture, an I picture or a P picture that has been decoded and that is temporally preceded by the current B picture, and an interpolated picture composed of those two pictures are used. The difference between the current B picture and each of the three types of pictures that have been motion-compensated is encoded or the current B picture is intra-encoded whichever most effective. One of the two processes is selected for each macro block.

Thus, there are four types of macro blocks. The first type is an intra-frame encoded macro block. The second type is a forward inter-frame macro block of which the future is predicted from the past. The third type is a backward inter-frame predictive macro block of which the past is predicted from the future. The fourth type is a bidirectional macro block of which the present is predicted from both the directions. All macro blocks contained in an I picture are intra-frame encoded macro blocks. A P picture contains intra-frame encoded macro blocks and forward inter-frame predictive macro blocks. A B picture contains all the four types of macro blocks.

A GOP contains at least one I picture. A GOP may contain neither a P picture, nor a B picture. As shown in FIG. 4A, the sequence layer as the highest layer is composed of a sequence header portion and a plurality of GOPs.

In the MPEG format, a slice is one variable length code sequence. A variable length code sequence is a sequence of which the boundary of data cannot be detected unless a variable length code is correctly decoded.

At the beginning of each of the sequence layer, the GOP layer, the picture layer, and the slice layer, a start code is placed. The start code has a bit pattern that is byte assigned. The start code placed at the beginning of the sequence layer is referred to as sequence header code. The start code placed at the beginning of each of the other layers is referred to as start code. The bit pattern of each sequence header code or each start code is [00 00 01 xx] (in hexadecimal notation). The bit pattern is composed of two-digit pairs. [xx] represents that a bit pattern varies in each layer.

In other words, each of a start code and a sequence header code is composed of four bytes (=32 bits). Corresponding to the value of the fourth byte, the type of information preceded thereby can be identified. Since each of a start code and a sequence header code is byte assigned, the type can be detected by performing a pattern match for four bytes.

The high order four bits of one byte preceded by the start code is an identifier that identifies the content of an extension data area (that will be described later). With the value of the identifier, the content of the extension data can be identified.

The macro block layer and each DCT block of each macro block do not contain an identification code having a bit pattern that is byte assigned.

Next, the header portion of each layer will be described in more detail. On the sequence layer shown in FIG. 4A, at the beginning, a sequence header 2 is placed. The sequence header 2 is followed by a sequence extension 3 and extension and user data 4. The sequence header 2 is preceded by a sequence header code 1. In addition, each of the sequence extension 3 and the user data 4 is preceded by a start code (not shown). The area from the sequence header 2 to the extension and user data 4 is a header portion of the sequence layer.

FIG. 5 shows the content and bit assignment of the sequence header 2. As shown in FIG. 5, the sequence header 2 contains a sequence header code 1, an encoding picture size (composed of number of horizontal pixels and number of vertical lines), an aspect ratio, a frame rate, a bit rate, a VBV (Video Buffering Verifier) buffer size, a quantizer matrix, and so forth that are information designated for each sequence and assigned predetermined numbers of bits.

In FIGS. 5 to 15, some parameters are omitted for simplicity.

As shown in FIG. 6, the sequence extension 3 preceded by the sequence header and the extension start code designates additional data such as a profile, a level, a chroma (chrominance difference) format, and a progressive sequence, and so forth that correspond to the MPEG2 system. As shown in FIG. 7, the extension and user data 4 can contain information of RGB conversion characteristics and display screen size with a sequence indications ( ). In addition, the extension and user data 4 can designate a scalability mode and a layer of scalability with a sequence scalable extension ( ).

The header portion of the sequence layer is followed by a GOP. As shown in FIG. 4B, at the beginning of a GOP, a GOP header 6 and user data 7 are placed. The GOP header 6 and the user data 7 compose the header portion of a GOP. As shown in FIG. 8, the GOP header 6 contains a GOP start code 5, a time code, and flags that represent independency and validity of the GOP. As shown in FIG. 9, the user data 7 contains extension data and user data. At the beginning of each of the extension data and the user data, a start code (not shown) is placed.

The header portion of the GOP layer is followed by a picture. As shown in FIG. 4C, at the beginning of a picture, a picture header 9, a picture encoding extension 10, and extension and user data 11 are placed. At the beginning of the picture header 9, a picture start code 8 is placed. At the beginning of each of the picture encoding extension 10 and the extension and user data 11, a predetermined start code is placed. The area from the picture header 9 to the extension and user data 11 is a header portion of a picture.

As shown in FIG. 10, the picture header 9 contains a picture start code 8 and encoding conditions of the screen. As shown in FIG. 11, the picture encoding extension 10 designates the range of a moving vector in the forward and backward directions and horizontal and vertical directions and a picture structure. In addition, the picture encoding extension 10 designates the accuracy of a DC coefficient of an intra-macro block and selects a VLC type, a linear/nonlinear quantizer scale, and a DCT scanning method.

As shown in FIG. 12, the extension and user data 11 designates quantizer matrixes, spatial scalable parameters, and so forth. They can be designated for each picture. Thus, each picture can be encoded corresponding to characteristics of each screen. In addition, the extension and user data 11 can designate a picture display area. Moreover, the extension and user data 11 can designate copyright information.

The header portion of the picture layer is followed by a slice. As shown in FIG. 4D, at the beginning of a slice, a slice header 13 is placed. At the beginning of the slice header 13, a slice start code 12 is placed. As shown in FIG. 13, the slice start code 12 contains vertical position information of the slice. In addition, the slice header 13 contains extension slice vertical position information, quantizer scale information, and so forth.

The header portion of the slice layer is followed by a macro block (FIG. 4E). In a macro block, a macro block header 14 is followed by a plurality of DCT blocks. As was described above, the macro block header 14 does not contain a start code. As shown in FIG. 14, the macro block header 14 contains relative position information of the macro block. In addition, the macro block header 14 designates a motion compensation mode and detail settings with respect to DCT encoding process.

The macro block header 14 is followed by a DCT block. As shown in FIG. 15, a DCT block contains DCT coefficients encoded with a variable length code and data with respect to the DCT coefficients.

In FIGS. 4A to 4E, solid line delimitations of each layer represent byte assigned data. In contrast, dotted line delimitations of each layer represent non byte assigned data. In other words, as shown in FIG. 16A, in each of higher layers from the sequence layer to the picture layer, each code boundary is byte assigned. In the slice layer, only the slice start code 12 is byte assigned, whereas each macro block can be bit assigned as shown in FIG. 16B. Likewise, in the macro block layer, each DCT block can be bit assigned.

To prevent a signal from being deteriorated in the decoding process and the encoding process, it is preferred to edit encoded data. When a P picture is decoded, a picture that is temporally preceded thereby is required. On the other hand, when a B picture is decoded, a picture that is temporally preceded thereby and a picture that is temporally followed thereby are required. Thus, the editing process cannot be performed in the unit of one frame. From such a point of view, according to the first embodiment of the present invention, one GOP is composed of one I picture.

In addition, since the MPEG2 system uses the variable length code encoding process, the amount of data for one frame is controlled so that data for one frame can be recorded in a record area having a predetermined size. In addition, according to the first embodiment of the present invention, one slice is composed of one macro block and one macro block is matched with a fixed length so that data can be suitably recorded on a magnetic tape.

Figure 17:
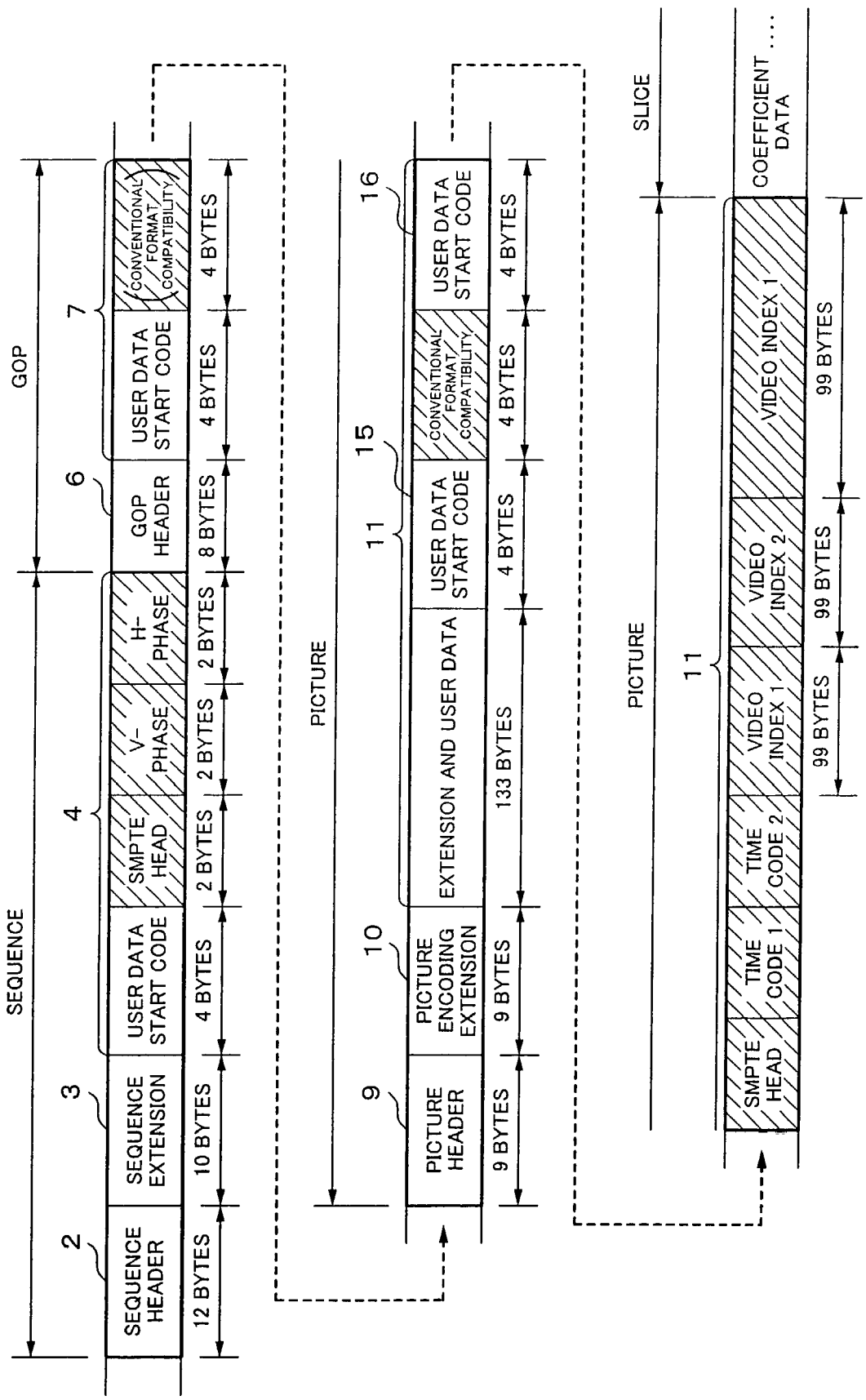
FIG. 17 is a schematic diagram practically showing headers of an MPEG stream according to an embodiment of the present invention.

FIG. 17 shows a practical example of a header of an MPEG stream according to the first embodiment of the present invention. As is clear from FIGS. 4A to 4E, a header portion of each of the sequence layer, the GOP layer, the picture layer, the slice layer, and the macro block layer is placed at the beginning thereof. FIG. 17 shows an example of a data arrangement that starts from the sequence header portion.

At the beginning, the sequence header 2 of 12 bytes is placed. The sequence header 2 is followed by the sequence extension 3 of 10 bytes. The sequence extension 3 is followed by the extension and user data 4. At the beginning of the extension and user data 4, a user data start code of four bytes is placed. The user data start code is followed by a user data area. The user data area contains information corresponding to the SMPTE (Society of Motion Pictures and Television Engineers) standard.

The header portion of the sequence layer is followed by a header portion of the GOP layer. At the beginning of the GOP layer, a GOP header 6 of eight bytes is placed. The GOP header 6 is followed by extension and user data 7. At the beginning of the extension and user data 7, a user data start code of four bytes is placed. The user data start code is followed by a user data area. The user data area contains information necessary for compatibility with another conventional video format.

The header portion of the GOP layer is followed by a header portion of the picture layer. At the beginning of the picture layer, a picture header 9 of nine bytes is placed. The picture header 9 is followed by a picture encoding extension 10 of nine bytes. The picture encoding extension 10 is followed by extension and user data 11. The first 133 bytes of the extension and user data 11 are extension and user data. The 133-byte area is followed by a user data start code 15 of four bytes. The user data start code 15 is followed by information necessary for compatibility with another conventional video format. The information is followed by a user data start code 16. The user data start code 16 is followed by data corresponding to the SMPTE standard. The header portion of the picture layer is followed by a slice.

Next, a macro block will be described in detail. A macro block contained in the slice layer is a set of a plurality of DCT blocks. An encoded sequence of DCT blocks is composed by encoding pairs of runs and levels. A run represents the number of zero coefficients of quantized DCT coefficients. A level represents a non-zero coefficient immediately preceded by the run. A byte assigned identification code is not added to a macro block and a DCT block of a macro block.

A macro block is a lattice element of which a screen (picture) is divided into 16 pixels×16 lines. A slice is composed of macro blocks connected in the horizontal direction. When two slices are successive, the last macro block of the earlier slice and the first macro block of the later slice are successive. Macro blocks of two successive slices are prohibited from overlapping. When the size of a screen is designated, the number of macro blocks per screen is uniquely designated.

The number of macro blocks in the vertical direction on the screen is denoted by mb_height. Likewise, the number of macro blocks in the horizontal direction on the screen is denoted by mb_width. The coordinates of a macro block on the screen are represented by mb_row and mb_column. mb_row represents the vertical macro block position number counted from the upper end of the screen, whereas mb_column represents the horizontal macro block position number counted from the left end of the screen. To represent the position of a macro block on the screen with one variable, macroblock_address is defined as follows.

$$macroblock\_address = mb\_row \times mb\_width + mb\_column$$

Slices and macro blocks in a stream should be in the order of smaller macroblock_address. In other words, a stream is transmitted from the top to the bottom and from the left to the right on the screen.

In the MPEG system, one slice is composed of one stripe (16 lines). The variable length code encoding process starts from the left end of the screen and ends at the right end of the screen. Thus, when an MPEG elementary stream that has been recorded by a VCR is reproduced at high speed, reproduced portions concentrate on the left end of the screen. Thus, the screen cannot be equally updated. In addition, since the position of data on a tape cannot be predicted, when a tape pattern is traced at predetermined intervals, the screen cannot be equally updated. In addition, when an error takes place at only one position, the error affects up to the right end of the screen. Thus, until the next slice header is detected, the apparatus cannot be recovered from the error. To solve such a problem, one slice is composed of one macro block.

Figure 18B:
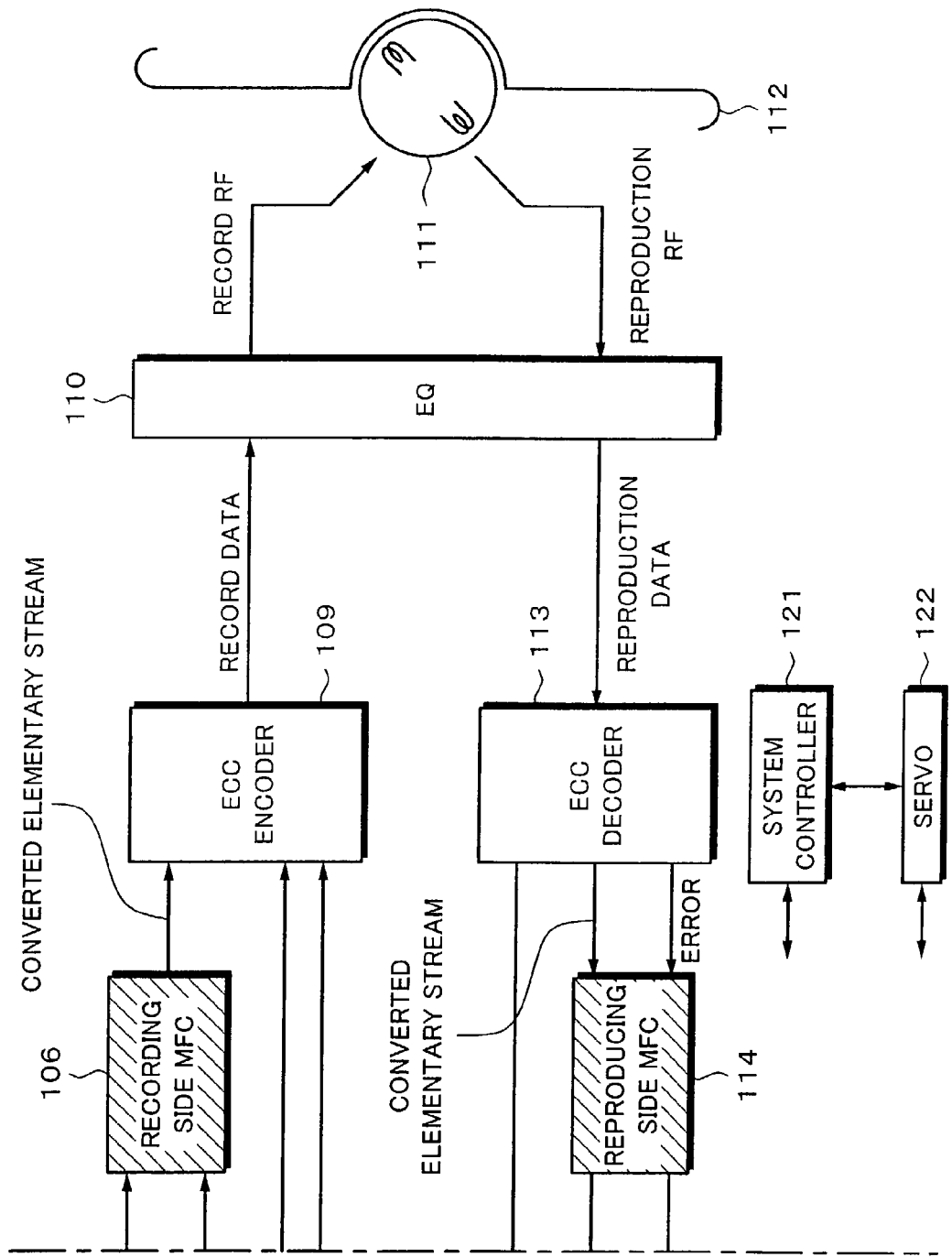
FIG. 18 is a block diagram showing an example of the structure of a recording and reproducing apparatus according to an embodiment of the present invention.

FIG. 18 shows an example of the structure of a recording and reproducing apparatus according to the first embodiment of the present invention. When the apparatus is operated in the recording mode, a digital signal is input from a terminal 100 and supplied to an SDI (Serial Data Interface) receiver 101. The SDI is an interface that has been prescribed by the SMPTE (Society of Motion Picture and Television Engineers). The SDI is used to transmit a (4:2:2) component video signal, a digital audio signal, and additional data. The SDI receiver 101 extracts a digital video signal and a digital audio signal from the input digital signal. The digital video signal (base band signal) is supplied to an MPEG encoder 102. The digital audio signal is supplied to an ECC encoder 109 through a delay portion 103. The delay portion 103 removes the time difference between the digital audio signal and the digital video signal.

An output signal of the SDI receiver 101 is also supplied to a switch circuit 550 through an EE path. When the EE path is selected by a switch circuit 550, the digital video signal that is output from the SDI receiver 101 is supplied to an SDI output portion 118 (that will be described later) through the EE path and the switch circuit 550. The digital video signal is obtained from an output terminal 120.

In addition, the SDI receiver 101 extracts a synchronous signal from the input digital signal and supplies the extracted synchronous signal to a timing generator 104. An external synchronous signal may be input to the timing generator 104 through a terminal 105. The timing generator 104 generates timing pulses corresponding to a designated signal that is one of the input synchronous signal and a synchronous signal that is supplied from an SDTI receiver 108 (that will be described later). The generated timing pulses are supplied to each portion of the recording and reproducing apparatus.

The MPEG encoder 102 performs a DCT (Discrete Cosine Transform) process for the input video signal, generates coefficient data, and encodes it with a variable length code. The variable length code (VLC) data that is output from the MPEG encoder 102 is an MPEG2 elementary stream (ES). The output data of the MPEG encoder 102 is supplied to one input terminal of a recording side multi-format converter (hereinafter referred to as MFC) 106.

On the other hand, SDTI (Serial Data Transport Interface) format data is input through an input terminal 107. The SDTI receiver 108 synchronously detects the signal of the data. The signal is temporarily stored to a buffer. The elementary stream is extracted from the signal. The extracted elementary stream is supplied to another input terminal of the recording side MFC 106. A synchronous signal that is detected by the SDTI receiver 108 is supplied to the forgoing timing generator 104.

An output signal of the SDTI receiver 108 is also supplied to a switch circuit 551 through the EE path. When the EE path side is selected by the switch circuit 551, an output signal of the SDTI receiver 108 is supplied to the error checker 530.

According to the first embodiment, to transmit for example an MPEG ES (MPEG Elementary Stream), SDTI (Serial Data Transport Interface-CP (Content Package) is used. The ES is a 4:2:2 component signal. In addition, as was described above, an ES is a stream that is composed of only I pictures and that has the relation of 1 GOP=1 picture. In the SDTI-CP format, an MPEG ES is divided into data units that can be accessed. In addition, an MPEG ES is packed to packets in each frame. In the SDTI-CP, a sufficient transmission band (at 27 MHz or 36 MHz of clock rate or 270 Mbps or 360 Mbps of stream bit rate) is used. Thus, in one frame period, an ES can be transmitted as a burst. The SDTI receiver 108 outputs an enable signal EN that represents a valid region of an ES that is output.

In other words, between SAV and EAV in one frame period, system data, a video stream, an audio stream, and AUX data are placed. Thus, data is not placed in all one frame period. In other words, data is placed as a burst in a predetermined period from the beginning of the frame. At the boundary of a frame, an SDTI-CP stream (video and audio) can be switched in a stream state. When a content signal uses an SMPTE time code as a clock reference, the SDTI-CP has a scheme that synchronizes audio data and video data. In addition, a format that allows SDTI-CP and SDI to co-exist has been prescribed.

As with the case that a TS (Transport Stream) is transmitted, since an interface that uses the forgoing SDTI-CP does not require the encoder and the decoder to use a VBV (Video Buffer Verifier) buffer and TBs (Transport Buffers). Thus, in this case, the delay of the ES can be decreased. In addition, since the SDTI-CP allows an TS to be transmitted at very high speed, the delay thereof can be further decreased. Thus, when there is a synchronization that allows the entire broadcasting station to be managed, the SDTI-CP can be effectively used.

In addition, the SDTI receiver 108 extracts a digital audio signal from the input SDTI-CP stream. The extracted digital audio signal is supplied to an ECC encoder 109.

The recording side MFC 106 has a selector and a stream converter as internal devices. The recording side MFC 106 is disposed in for example one integrated circuit. Next, a process performed by the recording side MFC 106 will be described. An MPEG ES supplied from the MPEG encoder 102 or an MPEG ES supplied from the SDTI receiver 108 is selected by the selector. The selected MPEG ES is supplied to the stream converter.

The stream converter rearranges DCT coefficients of each MPEG2 DCT block to those of each frequency component in a plurality of DCT blocks of one macro block. In addition, when one slice of an elementary stream is one stripe, the stream converter forms one slice with one macro block. Moreover, the stream converter limits the maximum length of variable length data of one macro block. To do that, the stream converter sets high order DCT coefficients to 0. The converted elementary stream arranged by the recording side MFC 106 is supplied to the ECC encoder 109.

A main memory (not shown) that has a large storage capacity is connected to the ECC encoder 109. The ECC encoder 109 has a packing and shuffling portion, an audio outer code encoder, a video outer code encoder, an inner code encoder, an audio shuffling portion, a video shuffling portion, and so forth as internal devices. In addition, the ECC encoder 109 contains a circuit that adds an ID to each sync block and a synchronous signal adding circuit. The ECC encoder 109 is composed of for example one integrated circuit.

According to the first embodiment of the present invention, as an error correction code for video data and audio data, a product code is used. A product code is used to encode a two-dimensional array of video data or audio data with an outer code in the vertical direction and encode the two-dimensional array with an inner code in the horizontal direction. Thus, data symbols are dually encoded. As an outer code and an inner code, the Reed-Solomon code is used.

Next, a process of the ECC encoder 109 will be described. Since video data of an elementary stream has been encoded with a variable length code, the length of data of each macro block varies. The packing and shuffling portion packs each macro block in a fixed length frame. At that point, a portion that overflows from the fixed length frame is successively packed to other blank areas each having the size of the fixed length frame.

In addition, system data that contains information of a picture format, a shuffling pattern version, and so forth is supplied from a system controller 121 (that will be described later). The system data is supplied from an input terminal (not shown). The system data is supplied to the packing and shuffling portion. As with picture data, a recording process for the system data is performed by the packing and shuffling portion. The packing and shuffling portion performs a shuffling process for rearranging macro blocks of one frame in the scanning order so as and dispersing record positions of macro blocks of one frame on the tape. Even if data is partially reproduced in a shuttle reproducing mode, since the data is shuffled, the update ratio of pictures can be improved.

The video data and the system data (unless otherwise specified, video data that contains system data is referred to as video data) are supplied from the packing and shuffling portion to the video outer code encoder that encodes video data with an outer code. The video outer code encoder adds an outer code parity to the video data. The video shuffling portion rearranges sync blocks of a plurality of ECC blocks so as to shuffle them. Since sync blocks are shuffled, an error can be prevented from concentrating on a particular ECC block. The shuffling process performed by the shuffling portion may be referred to as interleave. An output signal of the video shuffling portion is written to the main memory.

On the other hand, as was described above, a digital audio signal that is output from the SDTI receiver 108 or the delay portion 103 is supplied to the ECC encoder 109. According to the first embodiment of the present invention, a non-compressed digital audio signal is handled. Instead, a digital audio signal may be input through an audio interface. In addition, audio AUX is supplied from an input terminal (not shown). Audio AUX is auxiliary data. Audio AUX contains information with respect to audio data such as a sampling frequency of audio data. Audio AUX is added to audio data. Audio AUX is treated in the same manner as audio data.

Audio data to which audio AUX has been added (unless otherwise specified, audio data that contains audio AUX is also referred to as audio data) is supplied to the audio outer code encoder that encodes the audio data with an outer code. An output signal of the audio outer code encoder is supplied to the audio shuffling portion. The audio shuffling portion performs a shuffling process for the audio data. The audio data is shuffled in each sync block and in each channel.

An output signal of the audio shuffling portion is written to the main memory. As was described above, the output signal of the video shuffling portion has been also written to the main memory. The main memory mixes the audio data and the video data as data of one channel.

Data is read from the main memory. An ID that represents a sync block number is added to the data that is read from the main memory. The resultant data is supplied to the inner code encoder. The inner code encoder encodes the supplied data with an inner code. A synchronous signal is added to each sync block of the output signal of the inner code encoder. As a result, record data as a sequence of sync blocks is formed.

Record data that is output from the ECC encoder 109 is supplied to an equalizer 110 that has a recording amplifier and so forth. The equalizer 110 converts the record data into a record RF signal. The record RF signal is supplied to a rotating drum 111 that has a rotating head. The record RF signal is recorded on a magnetic tape 112. In reality, a plurality of magnetic heads that have different azimuths and that form adjacent tracks are disposed on the rotating drum 111.

When necessary, a scrambling process may be performed for record data. When record data is recorded, it may be digitally modulated. In addition, partial response class 4 and Viterbi code may be used. The equalizer 110 contains both a recording side structure and a reproducing side structure.

FIGS. 19A, 19B, 19C, and 19D show an example of the format of tracks formed on a magnetic tape by the forgoing rotating head. In the example, video data and audio data for one frame are recorded on four tracks. One segment is composed of two tracks having different azimuths. In other words, four tracks are composed of four segments. A pair of tracks that compose one segment are assigned track numbers [0] and [1] corresponding to azimuths. Video sectors are recorded on both ends of each track. Audio sectors are formed between video sectors. FIGS. 19A to 19D show an arrangement of sectors on a tape.

In the example, audio data of four channels can be handled. A1 to A4 represent channels 1 to 4 of audio data, respectively. Audio data of each channel is varied in each segment. In the example, data of four error correction blocks per track is interleaved and recorded as an upper side sector and a lower side sector.

A system area (SYS) in which system data is recorded is formed in a lower side video sector. System areas are alternately formed at the beginning position and the end position of lower side video sectors on each track.

Figure 19A:
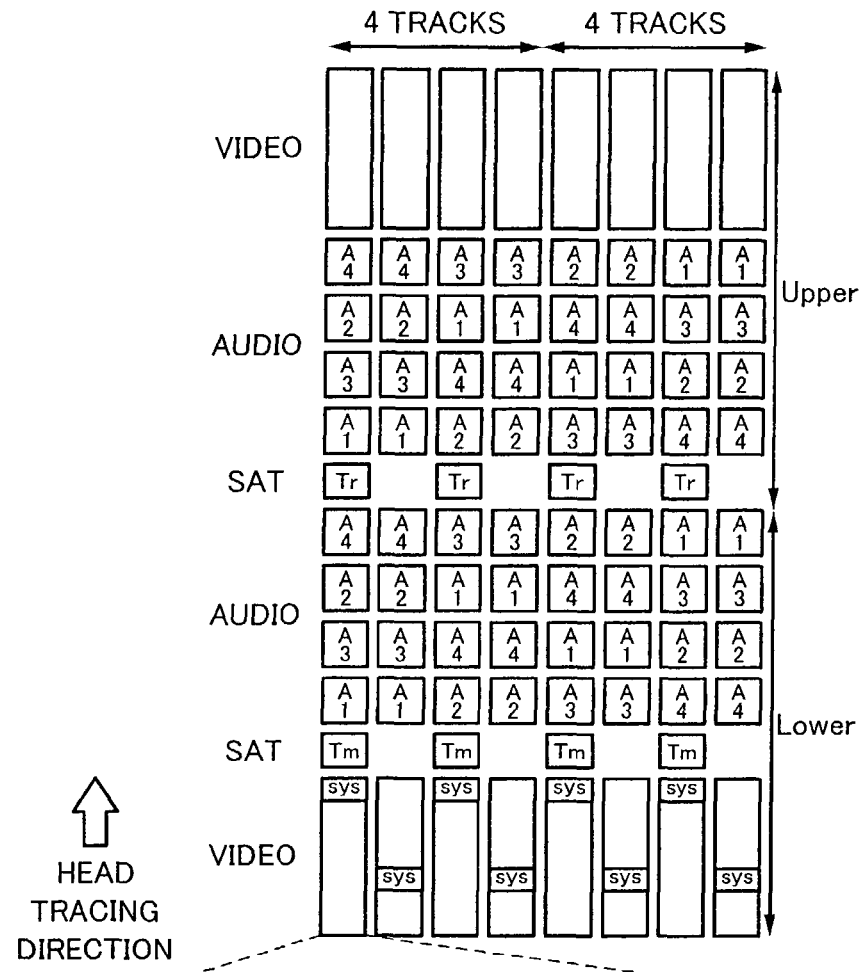
FIGS. 19A, 19B, 19C, and 19D are schematic diagrams showing an example of a track format formed on a magnetic tape.

In FIG. 19A, SAT is an area in which a servo lock signal is recorded. A gap is formed between adjacent record areas.

FIG. 19A shows an example of which data per frame is recorded with four tracks. However, depending on the format of which data is recorded and reproduced, data per frame can be recorded with eight tracks, six tracks, or the like.

Figure 19B:
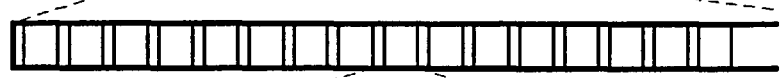
Figure 19C:

As shown in FIG. 19B, data recorded on a tape is composed of a plurality of blocks that are divided at equal intervals. These blocks are referred to as sync blocks. FIG. 19C shows an outline of the structure of a sync block. One sync block is composed of a sync pattern, an ID, a DID, a data packet, and an error correction inner code parity. The sync pattern is used to synchronously detect the sync block. The ID identifies the sync block. The DID represents the content of data preceded by the ID. Data of each sync block is treated as a packet. In other words, the minimum unit of data that is recorded or reproduced is one sync block. A video sector is composed of many sync blocks that are arranged (FIG. 19B).

Figure 19D:
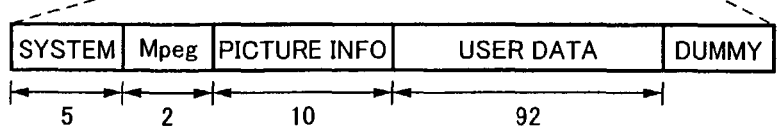

FIG. 19D shows the data structure of an example of the system area SYS. The data area of a sync block shown in FIG. 19C contains system data of five bytes, an MPEG header of two bytes, picture information of 10 bytes, and user data of 92 bytes placed in the order from the beginning.

The system data contains information that represents whether a switching point is present or absent, a position thereof, a video format (a frame frequency, an interleave method, an aspect ratio, and so forth), shuffling version information, and so forth. In addition, the system data contains an appropriate level (six bits) of a recorded MPEG ES syntax.

The MPEG header contains MPEG header information necessary for the shuttle reproducing operation. The picture information contains information necessary for the compatibility with another digital VCR. The user data contains a recorded date (year, month, and day), a cassette number, and so forth.

Returning to FIG. 18, when the VCR is operated in the reproducing mode, a reproductions signal is reproduced from the magnetic tape 112 by the rotating drum 111. The reproduction signal is supplied to a reproducing side structure of the equalizer 110 that contains a reproducing amplifier and so forth. The equalizer 110 performs an equalizing process and a waveform trimming process for the reproduction signal. When necessary, the equalizer 110 performs a digital demodulating process, a Viterbi decoding process, and so forth for the reproduction signal. An output signal of the equalizer 110 is supplied to an ECC decoder 113.

The ECC decoder 113 performs a reverse process of the ECC encoder 109. The ECC decoder 113 contains a main memory, an inner code decoder, an audio deshuffling portion, a video deshuffling portion, and an outer code decoder. The main memory has a large storage capacity. In addition, the ECC decoder 113 contains a deshuffling and depacking portion and a data interpolator for video data. Likewise, the ECC decoder 113 contains an AUX separator and a data interpolator for audio data. The ECC decoder 113 is composed of for example one integrated circuit.

Next, a process of the ECC decoder 113 will be described. The ECC decoder 113 synchronously detects a sync block, detects a synchronous signal added at the beginning of the sync block, and extracts the sync block. Each sync block of reproduction data is supplied to the inner code decoder. The inner code decoder corrects an error of the sync block with an inner code. An ID interpolating process is performed for an output signal of the inner code decoder. An ID of a sync block treated as an error with an inner code (for example, a sync block number) is interpolated. Reproduction data of which an ID has been interpolated is separated into video data and audio data.

As was described above, video data is composed of DCT coefficient data, which was generated in the MPEG intra encoding process, and system data. Audio data is composed of PCM (Pulse Code Modulation) data and audio AUX.

The separated audio data is supplied to the audio deshuffling portion. The audio deshuffling portion performs a reverse process of the shuffling process performed by the recording side shuffling portion. An output signal of the deshuffling portion is supplied to the audio outer code decoder. The audio outer code decoder corrects an error of the audio data with an outer code. The audio outer code decoder outputs audio data whose error has been corrected. When data has an error that cannot be corrected, an error flag is set to the data.

The audio AUX separator separates audio AUX from the output signal of the audio outer code decoder. The separated audio AUX is output from the ECC decoder 113 (the route is omitted). The audio AUX is supplied to for example the system controller 121 that will be described later. Audio data is supplied to the data interpolator. The data interpolator interpolates a sample that has an error. As an example of the interpolating method, an average value interpolating method or a preceding value holding method is used. In the average value interpolating method, a sample is interpolated with an average value of samples temporally preceded and followed thereby. In the preceding value holding method, the value of a preceding correct sample is held.

Output data of the data interpolator is audio data that is output from the ECC decoder 113. Audio data that is output form the ECC decoder 113 is supplied to a delay portion 117 and an SDTI output portion 115. The delay portion 117 is disposed so as to absorb the delay of video data processed in an MPEG decoder 116 that will be described later. Audio data that is supplied to the delay portion 117 is delayed for a predetermined time period and supplied to an SDI output portion 118.

The separated video data is supplied to the deshuffling portion. The deshuffling portion performs a reverse process of the shuffling process performed on the recording side. The deshuffling portion deshuffles each sync block shuffled by the shuffling portion on the recording side. Output data of the deshuffling portion is supplied to the outer code decoder. The outer code decoder corrects an error of the data with an outer code. When the data has an error that cannot be corrected with an outer code, a flag that represents such an error is set to the data.

Output data of the outer code decoder is supplied to the deshuffling and depacking portion. The deshuffling and depacking portion deshuffles each macro block that has been shuffled by the packing and shuffling portion on the recording side. In addition, the deshuffling and depacking portion depacks data that has been packed when the data has been recorded. In other words, the deshuffling and depacking portion restores each macro block that has been packed to an original variable length code. In addition, the deshuffling and depacking portion separates system data from the depacked data. The system data is output from the ECC decoder 113 and supplied to the system controller 121 that will be described later.

Output data of the deshuffling and depacking portion is supplied to the data interpolator. The data interpolator corrects an error of data to which the error flag has been set. In other words, before data is converted, if it contains an error, DCT coefficients of frequency components after the error position cannot be restored. To solve such a problem, data at the error position is substituted with an end-of-block code (EOB). In addition, DCT coefficients of frequency components after the error position are set to zero. Likewise, when the VCR is operated in the shuttle reproducing mode, only DCT coefficients corresponding to the length of a sync block are restored. The coefficients that exceed the length of a sync block are substituted with zero data. In addition, when a header added at the beginning of video data has an error, the data interpolator also performs a process for restoring a header (a sequence header, a GOP header, a picture header, user data, or the like).

Since DCT coefficients are arranged from DC components and low frequency components to high frequency components over DCT blocks, even if DCT coefficients are ignored after a particular position. DC components and lower frequency components can be equally placed in each DCT block that composes a macro block.

Video data that is output from the data interpolator of the ECC decoder 113. Output data of the ECC decoder 113 is supplied to a multi-format converter 114 on the reproducing side (hereinafter referred to as reproducing side MFC). The reproducing side MFC 114 performs a reverse process of the forgoing recording side MFC 106. The reproducing side MFC 114 contains a stream converter. The reproducing side MFC 114 is composed of for example one integrated circuit.

The stream converter performs a reverse process of the recording side stream converter. In other words, the stream converter rearranges DCT coefficients of each frequency component over DCT blocks into those of each DCT block. Thus, the reproduction signal is converted into an MPEG2 elementary stream.

As with the recording side, a sufficient transmission rate (band width) is assured for the input and output of the stream converter corresponding to the maximum length of macro blocks. When the length of macro blocks (slices) is not limited, it is preferred to assure a band width three times larger than the pixel rate.

An output signal of the stream converter is output from the reproduction side MFC 114. The output signal of the reproduction side MFC 114 is supplied to the error checker 530 through a switch circuit 551 that switches a path to the EE path. As was described above, the error checker 530 has the checker 530A and the switch circuit 530B. An output signal of the error checker 530 is supplied to the SDTI output portion 115 and the MPEG decoder 116.

In addition, the reproduction side MFC 114 outputs an enable signal EN that represents a valid region of an ES that is output.

The MPEG decoder 116 decodes an elementary stream and outputs video data. In other words, the MPEG decoder 142 performs a dequantizing process and an inverse DCT process. The decoded video data is supplied to the SDI output portion 118 through a switch circuit 550. As was described above, audio data separated from video data by the ECC decoder 113 has been supplied to the SDI output portion 118 through the delay portion 117. The SDI output portion 118 maps the supplied video data and audio data in the SDI format and outputs a stream having a data structure of the SDI format. The stream is output from the SDI output portion 118 to the outside of the apparatus through an output terminal 120.

On the other hand, as was described above, audio data separated from the video data by the ECC decoder 113 has been supplied to the SDTI output portion 115. The SDTI output portion 115 maps video data and audio data supplied as an elementary stream in the SDTI format and outputs a stream having a data structure of the SDTI format. The converted stream is output to the outside of the apparatus through an output terminal 119.

In FIG. 18, the system controller 121 is composed of for example a microcomputer. When a switch or the like disposed on a control panel (not shown) is operated, a control signal corresponding to the operation is supplied to the system controller 121. Corresponding to the control signal, the recording operation and the reproducing operation of the recording and reproducing apparatus are controlled by the system controller 121.

The control panel may have a displaying portion (not shown) composed of an LCD (Liquid Crystal Display). The display portion displays each state and so forth of the recording and reproducing apparatus corresponding to a display control signal generated by the system controller 121.

While the servo 122 is communicating with the system controller 121, the servo 122 performs a traveling control for the magnetic tape 112 and a drive control for a rotating drum 111.

Figure 20A:
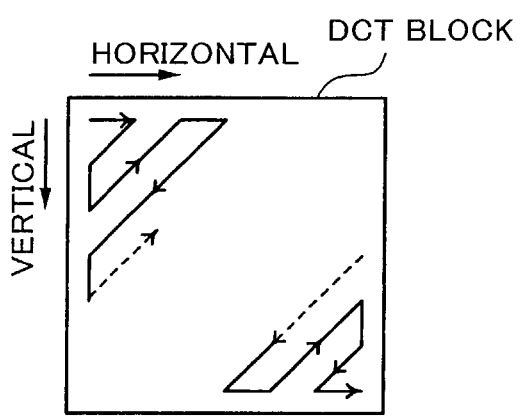
FIGS. 20A and 20B are schematic diagrams for explaining an output method of a video encoder and a variable length code encoding process.
Figure 20B:
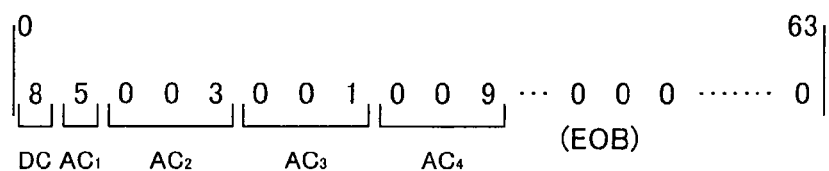

FIG. 20A shows the order of DCT coefficients of video data that are output from the DCT circuit of the MPEG encoder 102. That applies to an MPEG ES that is output from the SDTI receiver 108. Next, an example of output data of the MPEG encoder 102 will be described. In a DCT block, DCT coefficients are zigzag-scanned starting from a DC component at the upper left position in the direction of which higher horizontal and vertical spatial frequencies become higher. As a result, as shown in FIG. 20B, a total of 64 DCT coefficients (8 pixels×8 lines) are arranged in the order of frequency-components.

The VLC portion of the MPEG encoder encodes the DCT coefficients with a variable length code. In other words, the first coefficient is fixed as a DC component. The subsequent components (AC components) are assigned code symbols corresponding to the run of zeros and the level followed thereby. Thus, variable length code symbols of coefficient data of AC components are arranged from low frequency (order) components to high frequency (order) components as $AC_1, AC_2, AC_3, \ldots$ . The elementary stream contains DCT coefficients as variable length code symbols.

The recording side stream converter of the recording side MFC 106 rearranges DCT coefficients of the supplied signal. In other words, DCT coefficients zigzag-scanned and arranged in the order of frequency components are rearranged in the order of frequency components over DCT blocks that compose a macro block.

Figure 21A:
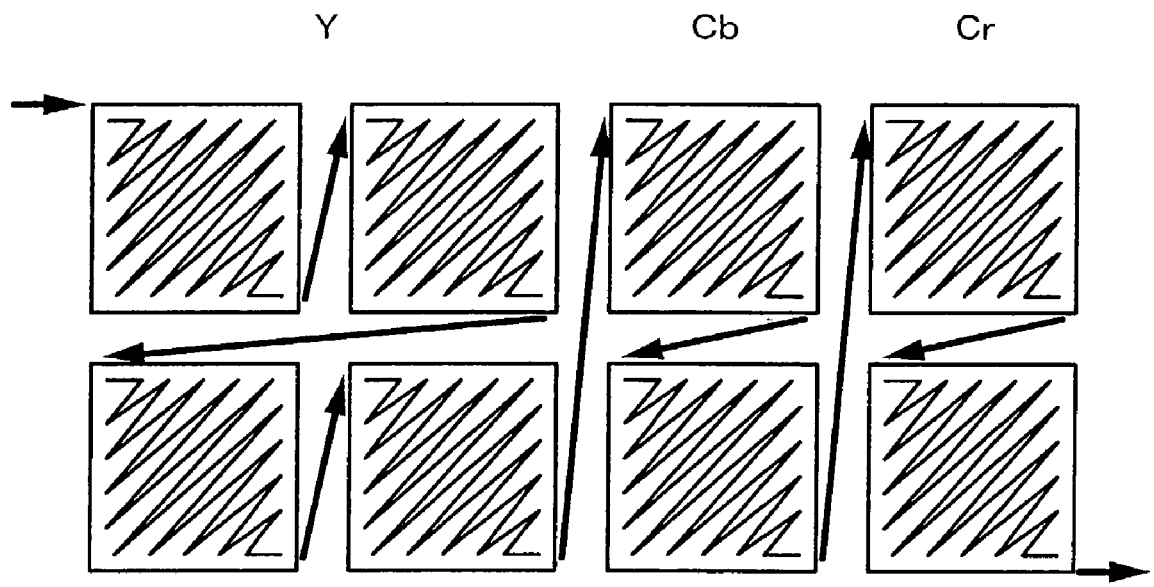
FIGS. 21A and 21B are schematic diagrams for explaining a rearrangement of the sequence of output data of the video encoder.
Figure 21B:
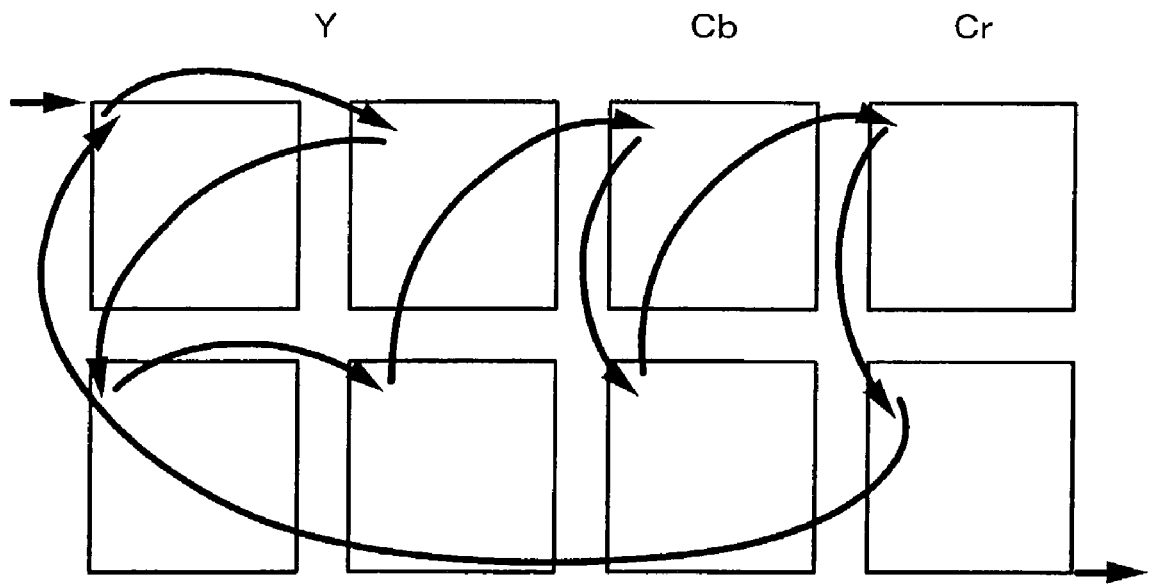

FIGS. 21A and 21B show DCT coefficients rearranged by the recording side stream converter. In the case of a (4:2:2) component signal, one macro block is composed of four DCT blocks ($Y_1, Y_2, Y_3$, and $Y_4$) of the luminance signal Y and four DCT blocks ($Cb_1$, $Cb_2$, $Cr_1$, and $Cr_2$) of the chrominance signals Cb and Cr.

As was described above, the MPEG encoder 102 zigzag-scans DCT coefficients as prescribed in the MPEG2 standard. As shown in FIG. 21A, in each DCT block, DCT coefficients are arranged from a DC component and low frequency components to high frequency components. After one DCT block has been scanned, the next DCT block is scanned. In the same manner, DCT coefficients are arranged.

In other words, in a macro block, DCT coefficients are arranged from a DC component and low frequency components to high frequency components for each of the DCT blocks $Y_1, Y_2, Y_3$, and $Y_4$ and the DCT blocks $Cb_1$, $Cr_1$, $Cb_2$, and $Cr_2$. DCT coefficients are encoded as variable length code symbols so that code symbols [DC, $AC_1$, $AC_2$, $AC_3$, ... ] are assigned to pairs of runs and levels.

The recording side stream converter temporarily reads a variable length code of DCT coefficients that have been encoded therewith, detects the delimiter of each coefficient, and groups DCT coefficients corresponding to each frequency component over the DCT blocks that compose the macro block as shown in FIG. 21B. First of all, DC components of eight DCT blocks of the macro block are grouped. Thereafter, AC coefficient components of the lowest frequency component of the eight DCT blocks are grouped. Likewise, AC coefficients of each frequency component of the eight DCT blocks are grouped. In such a manner, coefficients data over the eight DCT blocks are rearranged.

Thus, the coefficient data is rearranged as DC ($Y_1$), DC ($Y_2$), DC ($Y_3$), DC ($Y_4$), DC ($Cb_1$), DC ($Cb_2$), DC ($Cr_1$), DC ($Cr_2$), $AC_1(Y_1)$, $AC_1(Y_2)$, $AC_1(Y_3)$, $AC_1(Y_4)$, $AC_1(Cb_1)$, $AC_1(Cb_2)$, $AC_1(Cr_1)$, $AC_1(Cr_2)$, ... where DC, $AC_1$, $AC_2$, ... are variable length code symbols assigned to pairs of runs and levels as was described with reference to FIG. 20B.

The converted elementary stream of which the order of coefficient data has been rearranged by the recording side stream converter is supplied to the packing and shuffling portion of the ECC encoder 109. The length of data of a macro block of a converted elementary stream is the same as that of a nonconverted elementary stream. The MPEG encoder 102 controls a bit rate so that the length of each GOP (one frame) is fixed. However, the length of each macro block varies. The packing and shuffling portion matches data of each macro block with a fixed length frame.

Figure 22A:
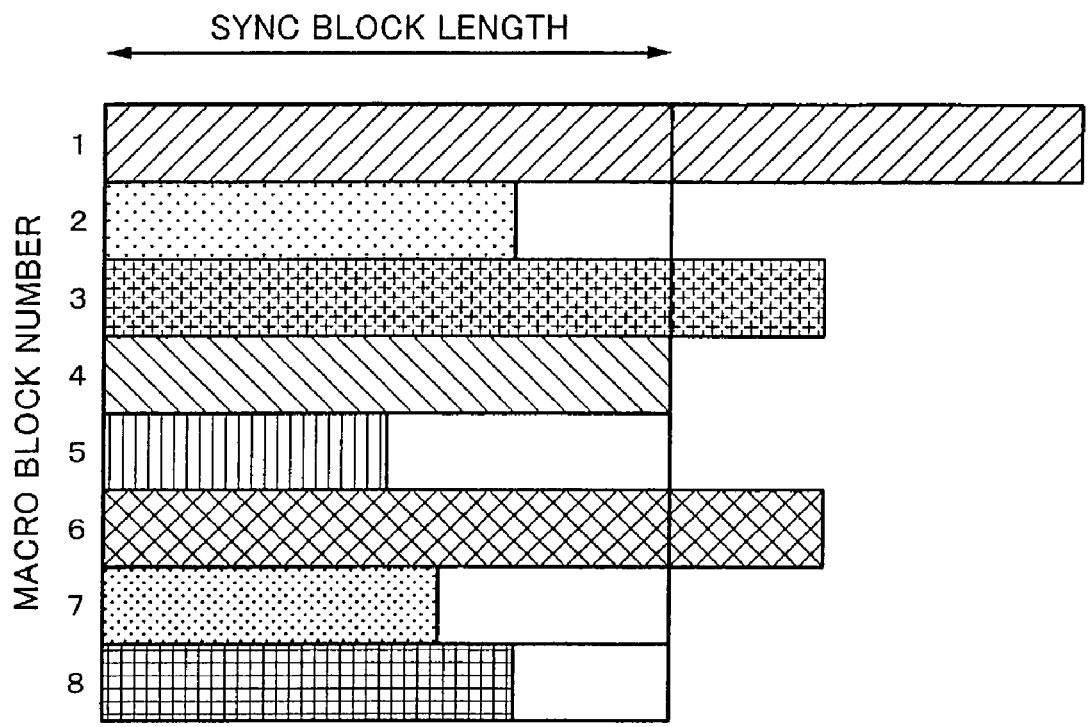
FIGS. 22A and 22B are schematic diagrams for explaining a process that packs data whose sequence has been rearranged to sync blocks.
Figure 22B:
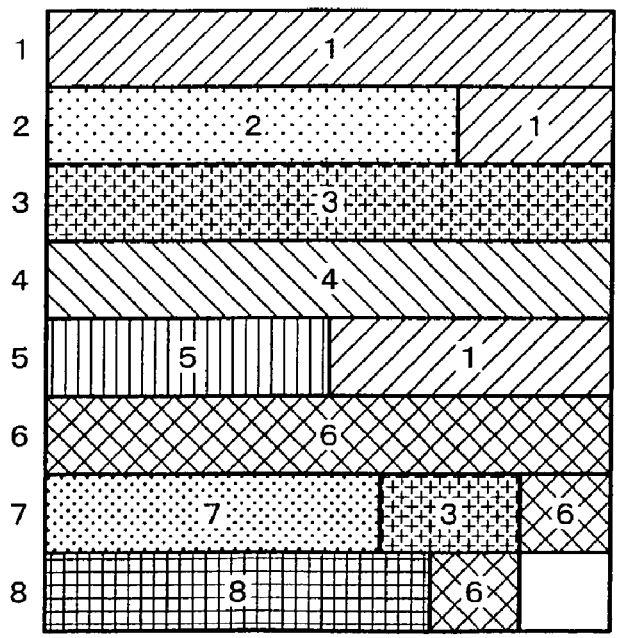

FIGS. 22A and 22B show a packing process for macro blocks performed by the packing and shuffling portion. Macro blocks are matched with the fixed data length frame. The data length of the frame is matched with the data length of a sync block that is the minimum unit of data that is recorded and reproduced. This process is performed so as to simplify the shuffling and error correction code encoding process. In FIGS. 22A and 22B, for simplicity, it is assumed that one frame contains eight macro blocks.

As shown in FIG. 22A, when data is encoded with a variable length code, the lengths of eight macro blocks differ from each other. In the example, when the length of each macro block is compared with the length of a data area of one sync block as the fixed length frame, the length of each of data of macro block #1, data of macro block #3, and data of macro block #6 is larger than the length of the fixed length frame. The length of each of data of macro block #2, data of macro block #5, data of macro block #7, and data of macro block #8 is smaller than the length of the fixed length frame. The length of data of macro block #4 is equal to the length of the fixed length frame.

Each macro block is packed to the fixed length frame that has the length of one sync block by the packing process. Data is equally packed because the amount of data that is generated in one frame period is controlled to a fixed amount. As shown in FIG. 22B, when the length of a macro block is larger than the length of one sync block, the macro block is divided at the position corresponding to the length of one sync block. The portion that exceeds (overflows) from the length of one sync block is packed after blank macro block(s) whose length is smaller than the length of one sync block.

In the example shown in FIG. 22B, the overflow portion of macro block #1 is packed after macro block #2. When the length of the packed portion of macro block #2 exceeds the length of one sync block, the overflow portion of macro block #1 is packed after macro block #5. Thereafter, the overflow portion of macro block #3 is packed after macro block #7. The overflow portion of macro block #6 is packed after macro block #7. The overflow portion of macro block #7 is further packed after macro block #8. In such a manner, each macro block is packed to the fixed length frame that has the length of one sync block.

The length of the variable length data of each macro block can be predetermined by the recording side stream converter. Thus, the packing portion can detect the end of data of a macro block without need to decode VLC data and check the content thereof.

FIG. 23 shows a more practical structure of the forgoing ECC encoder 109. In FIG. 23, reference numeral 164 is an interface for an external main memory 160 against an IC. The main memory 160 is composed of an SDRAM. The interface 164 arbitrates a request that the ECC encoder 109 issues to the main memory 160 and performs a writing process and a reading process for the main memory 160. A packing portion 137a, a video shuffling portion 137b, and a packing portion 137c compose a packing and shuffling portion 137.

Figure 24:
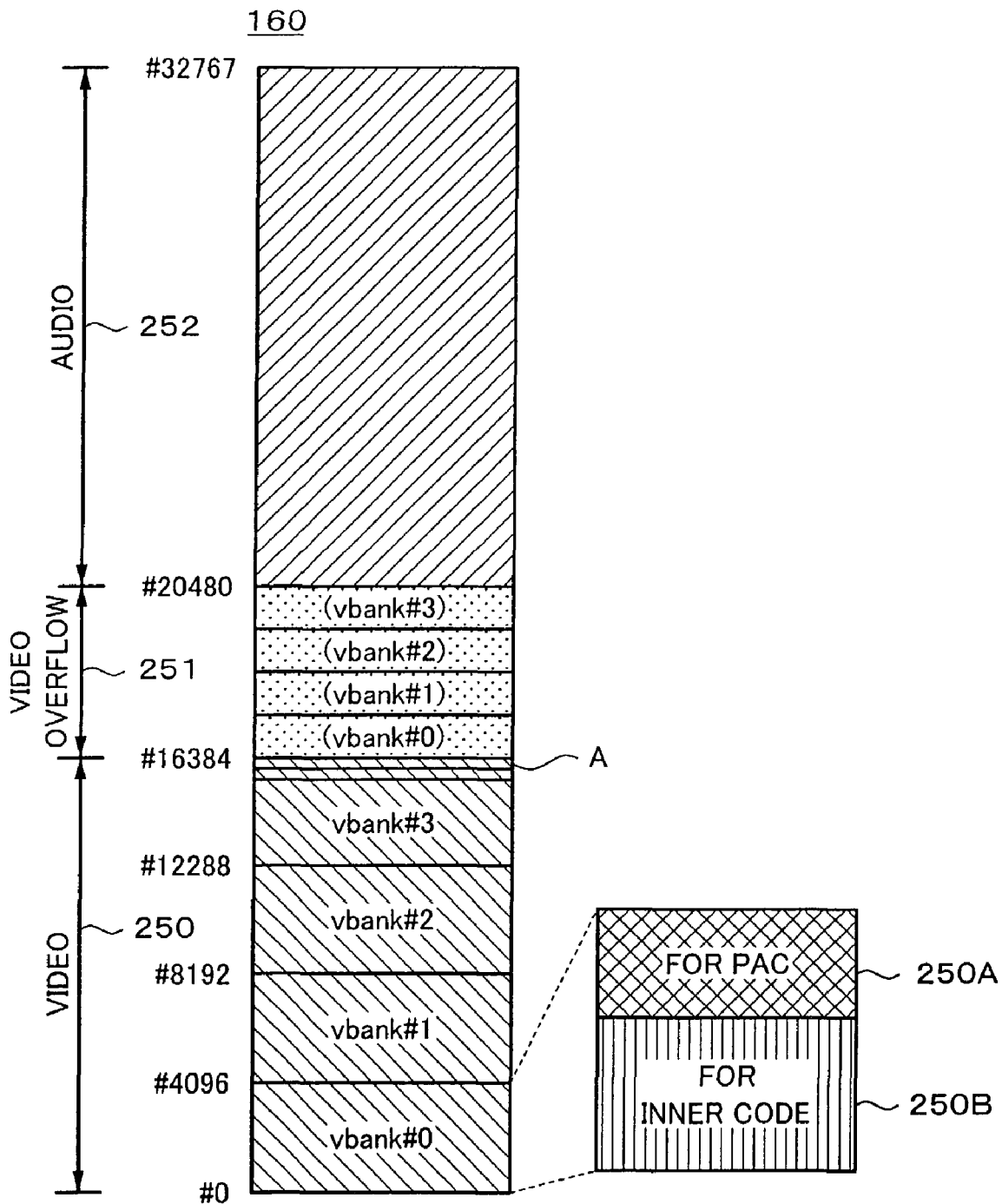
FIG. 24 is a schematic diagram showing an example of an address structure of a main memory.

FIG. 24 shows an example of the address structure of the main memory 160. The main memory 160 is composed of for example an SDRAM of 64 Mbits. The main memory 160 has a video area 250, an overflow area 251, and an audio area 252. The video area 250 is composed of four banks (vbank #0, vbank #1, vbank #2, and vbank #3). Each of the four banks can store a digital video signal for one equal length unit. One equal length unit is a unit of which the amount of data to be generated is controlled to a nearly target value. For example, one equal length unit is one picture of a video signal (I picture). In FIG. 24, portion A represents a data portion of one sync block of a video signal. The number of bytes of data placed in one sync block depends on the format for use. To deal with a plurality of formats, the data size of one sync block is designated a value larger than the maximum number of bytes and that is suitable for the process (for example, 256 bytes).

Each bank of the video area is divided into a packing area 250A and an output area 250B for an inner code encoder. Corresponding to the forgoing video area, the overflow area 251 is composed of four banks. In addition, the main memory 160 has an area 252 in which audio data is processed.

According to the first embodiment of the present invention, with reference to a data length mark of each macro block, the packing portion 137a stores fixed frame length data and overflow data that exceeds the fixed frame length to different areas of the main memory 160. The fixed frame length data is data equal to or smaller than the length of the data area of one sync block. Hereinafter, the fixed frame length data is referred to as block length data. The block length data is stored in a packing process area 250A of each bank. When the data length is smaller than the block length, a blank area takes place in the main memory 160. The video shuffling portion 137*b* controls write addresses so as to shuffle data. The video shuffling portion 137*b* shuffles only block length data. The video shuffling portion 137*b* does not shuffle the overflow portion, but write it to an area assigned thereto.

Next, the packing portion 137*c* packs and writes the overflow portion to a memory of an outer code encoder 139. In other words, data of the block length is written from the main memory 160 to a memory for one ECC block of the outer code encoder 139. When block length data has a blank area, an overflow portion is written and packed to the blank area. When data for one ECC block is written, the writing process is temporarily stopped. The outer code encoder 139 generates an outer code parity. The outer code parity is stored to the memory of the outer code encoder 139. After the outer code encoder 139 has processed one ECC block, the packing portion 137C rearranges data and an outer code parity supplied from the outer code encoder 139 in the order of an inner code. The resultant data is written to the area 250A in which the packing process is performed and another of the main memory 160. A video shuffling portion 140 controls addresses for which data that has been encoded with an outer code is written to the main memory 160 so as to shuffle each sync block.

Block length data and overflow data are separately written to the first area 250A of the main memory 160 (as a first packing process). Overflow data is packed and written to the memory of the outer code encoder 139 (as a second packing process). An outer code parity is generated. Data and an outer code parity are written to the second area 250B of the main memory 160. Those processes are performed in the unit of one ECC block. Since the outer code encoder 139 has a memory having the size of one ECC block, the access frequency of the main memory 160 can be decreased.

After a predetermined number of ECC blocks (for example, 32 ECC blocks) contained in one picture have been processed, the packing process and outer code encoding process for one picture are completed. Data that is read from the area 250B of the main memory 160 through the interface 164 is processed by an ID adding portion 148, an inner code encoder 147, and a synchronization adding portion 150. A parallel to serial converting portion 124 converts output data of the synchronization adding portion 150 into bit serial data. The output serial data is processed by a partial response class 4 pre-coder 125. When necessary, output data of the partial response class 4 pre-coder 125 is digitally modulated. The resultant data is supplied to the rotating head disposed on the rotating drum 111 through the recording amplifier 110.

A sync block that does not contain valid data (such a sync block is referred to as null sync) is placed in an ECC block so as to allow the structure of an ECC block to have flexibility against the difference of formats of record video signals. A null sync is generated by the packing portion 137*a* of the packing and shuffling portion 137 and written to the main memory 160.

In the case of audio data, even numbered samples and odd numbered samples of audio data of one field compose different ECC blocks. A sequence of an ECC outer code is composed of audio samples in the input sequence. Whenever an audio sample of an outer code sequence is input, an outer code encoder 136 generates an outer code parity. By controlling addresses at which output data of the outer code encoder 136 is written to the area 252 of the main memory 160, a shuffling portion 137 performs a shuffling process (for each channel and for each sync block).

In addition, a CPU interface 126 is disposed. The CPU interface 126 receives data from an external CPU 127 that functions as a system controller. The CPU interface 126 designates a parameter for an internal block. The CPU interface 126 can designate many parameters such as a sync block length and a parity length so as to deal with a plurality of formats.

A parameter "packing length data" is sent to the packing portions 137*a* and 137*b*. The packing portions 137*a* and 137*b* pack VLC data to a predetermined fixed frame (having a length represented as "sync block length" in FIG. 22A) corresponding to the parameter "packing length data".

A parameter "number of packs" is sent to the packing portion 137*b*. The packing portion 137*b* determines the number of packs per sync block corresponding to the parameter "number of packs" and supplies data corresponding to the determined number of packs to the outer code encoder 139.

A parameter "number of video outer code parities" is sent to the outer code encoder 139. The outer code encoder 139 encodes video data with outer code parities corresponding to the parameter "number of video outer code parities".

A parameter "ID information" and a parameter "DID information" are sent to the ID adding portion 148. The ID adding portion 148 adds the ID information and the DID information to a data sequence of unit length that is read from the main memory 160.

A parameter "number of video inner code parities" and a parameter "number of audio inner code parities" are sent to the inner code encoder 149. The inner code encoder 149 encodes video data and audio data with inner code parities corresponding to the parameter "number of video inner code parities" and the parameter "number of audio inner code parities". A parameter "sync length" is also sent to the inner code encoder 149. The inner code encoder 149 limits the unit length of data encoded with an inner code corresponding to the parameter "sync length".

A parameter "shuffling table" is stored in a video shuffling table (RAM) 128*v* and an audio shuffling table (RAM) 128*a*. The shuffling table 128*v* converts addresses of data shuffled by the video shuffling portions 137*b* and 140. The shuffling table 128*a* converts addresses of data shuffled by the audio shuffling portion 137.

Next, a checking process for an elementary stream and an output stopping process corresponding to the checked result will be described. These processes are performed by the error checker 530 according to an embodiment of the present invention. First of all, the error checker 530 will be described in detail. The checker 530A decodes a variable length code of the supplied MPEG ES and extracts header information therefrom. The checker 530A determines whether or not the extracted header information satisfies a predetermined condition so as to detect a syntax error or a format violation.

Figure 25:
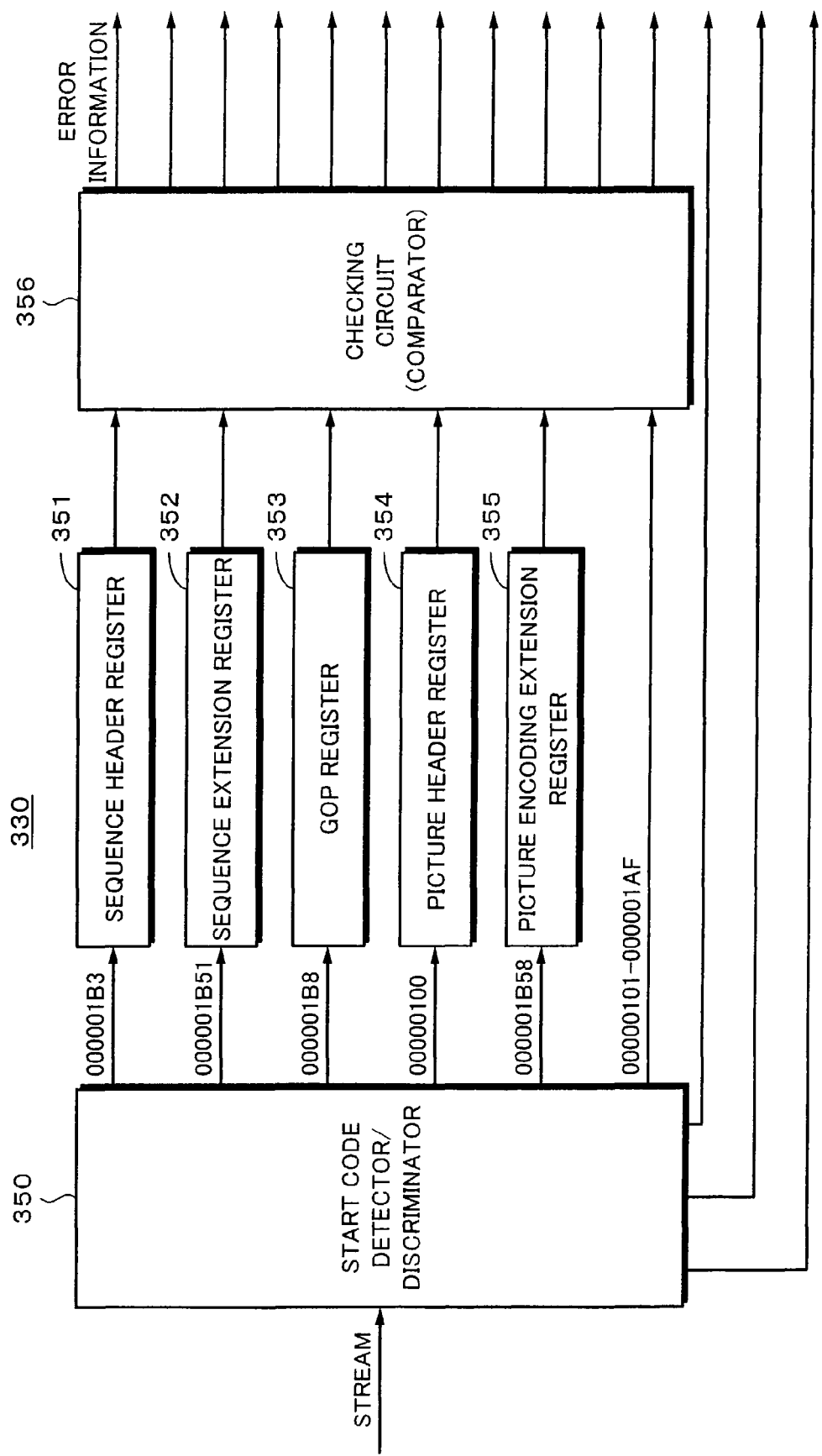
FIG. 25 is a block diagram showing the structure of an example of a syntax checker.

The checker 530A has a syntax checker 330 and a format checker 331. The syntax checker 330 detects a syntax error. The format checker 331 detects a format violation. FIG. 25 shows the structure of an example of the syntax checker 330 that extracts header information from a stream and detects a syntax error from the header information. In the structure shown in FIG. 25, the syntax checker 330 detects a syntax error from a sequence header 2, a sequence extension 3, a GOP header 6, a picture header 9, a picture encoding extension 10, and each slice. An MPEG ES is supplied to a start code detector/discriminator 350. The start code detector/discriminator 350 performs a bit pattern matching process, detects a data sequence [00 00 01] (in hexadecimal notation), and extracts a start code.

After the start code has been extracted, a pattern matching process is performed for the next two bytes (namely, the fourth byte and the fifth byte preceded by the start code). The pattern of the two bytes preceded by [00 00 01] represent areas of headers and header extensions of individual layers. Numeric values in brackets [ ] represent hexadecimal notation (this applies to the following description). x in brackets [ ] represents any value.

[B3]: Sequence header 2
[B5 1x]: Sequence extension 3
[B5 2x]: Sequence display
[B5 5x]: Sequence scalable extension
[B8]: GOP header 6
[00]: Picture header 9
[B5 8x]: Picture encoding extension 10
[B5 3x]: Quantizer matrix extension
[B5 7x]: Picture display extension
[B5 Ax]: Picture temporal scalable extension
[B5 9x]: Picture spatial scalable extension
[B5 4x]: Copyright extension
[B5 2]: User data
[01] to [AF]: Slice (slice vertical position)
[B5 8]: Sequence end Corresponding to the start code of each header detected by the start code detector/discriminator 350, each header is discriminated from the MPEG ES. Information of the headers that are discriminated (namely, parameter values of headers) is stored in registers 351, 352, 353, 354, and 355. The parameter values of the sequence header 2 are stored in the register 351. The parameter values of the sequence extension 3 are stored in the register 352. The parameter values of the GOP header 6 are stored in the register 353. The parameter values of the picture header 9 are stored in the register 354. The parameter values of the picture encoding extension 10 are stored in the register 355.

The parameter values of the headers stored in the registers 351 to 355 are supplied to a checking circuit 356. For example, internal registers (not shown) of the checking circuit 356 have stored interdiction values and reserved values of the parameters of the headers. The checking circuit 356 is a comparator that compares the parameters of the headers supplied from the registers 351 to 355 with values stored in the registers of the checking circuit 356. When the compared result represents that the parameter value of each header is an interdiction value or is not a reserved value, the parameter value is treated as an error and error information is output.

Figure 26:
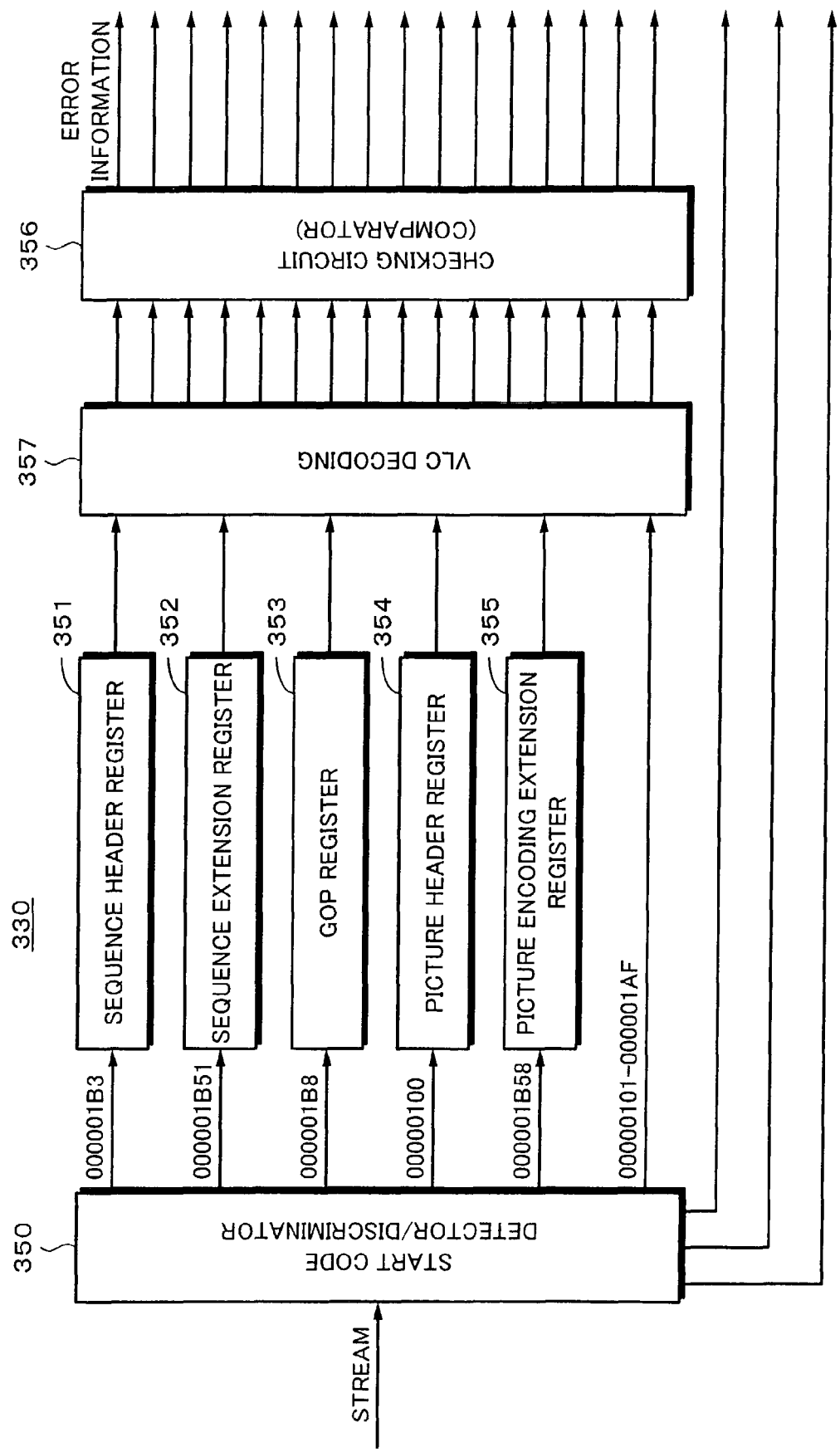
FIG. 26 is a block diagram showing the structure of an example of a syntax checker having a VLC decoding circuit that decodes a variable length code.

As shown in FIG. 26, the syntax checker 330 has a VLC decoding circuit 357. The VLC decoding circuit 357 decodes a variable length code. When the VLC decoding circuit 357 decodes a variable length code, the VLC decoding circuit 357 can extract internal information of a macro block therefrom. As a result, an error can be more accurately determined. For example, an EOB (End Of Block) that represents the end of a macro block can be detected. The syntax checker 330 shown in FIG. 26 can perform all the checking process of the syntax checker 330 shown in FIG. 25.

Next, an example of the syntax checking process will be described step by step. As step 1, when each header is captured, several items exemplified in the following can be checked. For example, when at least one of the following items is not satisfied, it is determined that the stream contains a syntax error.

(1) The fourth byte of the start code should be one of [00] to [AF], [B2] to [B5], and [B7] to [FF]. In addition, since [B0], [B1], and [B6] are undefined, when the fourth byte of the start code is one of them, a syntax error takes place.

(2) The high order four bits of the fifth byte of extension start code (extention_start_code) that represents an extension of each header should be one of [1] to [5] and [7] to [A]. Since [0], [6], and [B] to [F] are undefined, when the high order four bits of the fifth byte is one of them, a syntax error takes place.

(3) The sequence header 2 should be immediately followed by the sequence extension 3 or the sequence end code.

(4) The sequence extension 3 should be immediately followed by the sequence display extension, sequence scalable extension, user data, GOP header 6, picture header 9, or sequence end code.

(5) The GOP header 6 should be immediately followed by the user data or picture header 9.

(6) The picture header 9 should be immediately followed by the picture encoding extension 10 or picture header 9.

(7) The picture encoding extension 10 should be immediately followed by the quantizer matrix extension, picture display extension, picture temporal scalable extension, picture spatial scalable extension, copyright extension, user data, slice start code 12, or picture header 9.

(8) The slice (slice vertical position) should be simply incremented.

At step 2, a predetermined amount of a header preceded by the start code captured by the pattern matching process is extracted. For example, excluding each start code, eight bytes of the sequence header 2, six bytes of the sequence extension 3, four bytes of the GOP header 6, and five bytes of the picture encoding extension 10 are extracted. The GOP header 6 can be omitted. In this stage, the data length of each header is checked. In other words, when four bytes of a start code is added to each header, unless the data length of the sequence header 2 is equal to or longer than (4+8) bytes, the data length of the sequence extension 3 is equal to or longer than (4+6) bytes, the data length of the GOP header 6 is equal to or longer than (4+4) bytes, the data length of the picture header 9 is equal to or longer than (4+4) bytes, and the data length of the picture encoding extension 10 is equal to or longer than (4+5) bytes (for example, if a start code is detected within the data length of each header, it is determined that the stream contains a syntax error.

At step 3, it is checked whether or not each parameter value of each header that has been extracted satisfies conditions prescribed in the MPEG standard. With reference to FIGS. 2 to 12, it is determined whether or not each value is any interdiction value or any undefined value of the MPEG standard. When any parameter value of each header value is any interdiction value or any undefined value of the MPEG standard, it is determined that the stream contains a syntax error.

When the stream violates one of the following conditions, it is determined that the stream contains a syntax error. In the following, description in brackets ( ) represents a interdiction value or an undefined value.

(1) horizontal_size≠0 (interdiction value)
(2) vertical_size≠0 (interdiction value)
(3) aspect_ratio information≠0 (interdiction value)
(4) aspect_ratio information≠5, 6, 7, . . . , 15 (undefined value)
(5) frame_rate_code≠0 (interdiction value)
(6) frame_rate_code≠9, 10, 11, . . . , 15 (undefined value)
(7) profile_and_level_indication≠(undefined value)
(8) chroma_format≠0 (undefined value)
(9) picture_coding_type=1 (specified value) in the first picture of a GOP
(10) picture_coding_type≠0, 4 (interdiction value)
(11) picture_coding_type≠5, 6, 7 (undefined value)
(12) f code≠0 (interdiction value)
(13) f code≠10 to 14 (undefined value)
(14) picture_structure≠0 (undefined value)
(15) quantizer_scale_code≠0 (undefined value)
(16) marker_bit=1 (specified value)

At step 4, a combination of parameters is checked. Some parameters are restricted with values of other parameters as follows. When the stream violates one of the following conditions, it is determined that the stream contains a syntax error.

(1) When picture_coding_type=1, then f code=15
(2) When progressive_sequence=1, then progressive_frame=1
(3) When progressive_frame=1, then picture_structure=Frame
(4) When progressive_frame=1, then frame_pred_frame_dct=1
(5) When progressive_frame=0, then repeat_first_field=0
(6) When picture_structure=Field, then top_field_first=0
(7) When picture_structure=Field, then frame_pred_frame_dct=0
(8) When progressive_sequence=1, then top_field_first=0 or repeat_first_field=1
(9) When chroma_format=4:2:0, then chroma_420 type=progressive_frame
(10) chroma_format≠4:2:0, then chroma_420 type=0

Steps 1 to 4 above are performed by the syntax checker 330 shown in FIGS. 25 and 26. However, step 5 below is performed by only the syntax checker 330 shown in FIG. 26.

At step 5, the contents of a slice and a macro block are checked. At steps 1 to 4, the content of each header is checked without decoding a variable length code of the MPEG ES. In contrast, at step 5, the content of each header is checked by decoding a variable length code of the MPEG ES. At the beginning of a macro block, a start code that has a predetermined bit sequence is not placed. On the other hand, an EOB is placed at the end of encoded data of which runs and levels of DCT coefficients have been encoded. To divide successive macro blocks, a variable length code is decoded so that at least codes of runs and levels and EOB can be distinguished.

A macro block of which a variable length code has been decoded is checked for the following items.

(1) The decoding process for a variable length code should not be disabled in the middle.
(2) slice_vertical_position should not decrease.
(3) slice_vertical_position≦(vertical_size+15)/16 should be satisfied.
(4) mb_horizontal_position should not decrease in the same stripe.
(5) mb_horizontal_position≦(horizontal_size+15)/16 should be satisfied.
(6) quantizer_scale_code≠0 (interdiction value) should be satisfied. (quantizer_scale_code is a parameter of each of the slice layer and the macro block layer).

In addition, when intra DC, run codes, and level codes are decoded, the stream is checked for the following conditions.

(1) Intra DC should not exceed the range defined by intra_dc_precision.
(2) The number of quantizer DCT coefficients in one DCT block does not exceed 64.
(3) A macro block of an I picture should have DCT blocks designated by chroma_format. In other words, the macro block should contain EOBs designated by chroma_format.
(4) A macro block of a P picture or a B picture should have DCT blocks designated by coded_block_pattern. In other words, the macro block should contain EOBs designated by chroma_format.

In this case, it is not necessary to decode run and level codes to DCT coefficients and inversely quantize the run and level codes.

At steps 1 to 5, the syntax checker 330 can detect a syntax error of an MPEG ES.

Next, the detecting process for a format violation will be described. Generally, video apparatuses used in a broadcasting station or those used by professional users deal with only limited video data formats. For example, in these apparatuses, combinations of picture sizes and frame frequencies are limited to "720 samples×512 or 480 lines, 29.97 Hz, interlaced" and "720 samples×608 lines, 25 Hz, interlaced". In addition, as with the first embodiment, when a stream is edited in the unit of a frame, one frame should be composed of one I picture. According to the first embodiment, with the condition of one slice=one macro block, a picture search is accomplished.

When an input base band signal is encoded by an MPEG encoder and the encoded signal is recorded, encoding parameters of the apparatus can be used without any problem. However, when an MPEG ES that has been encoded by an external apparatus is directly input to a recording apparatus and recorded thereby, it is not assured that the input MPEG ES complies with the encoding parameters of the recording apparatus. In this case, the format of an MPEG ES that can be input to the recording apparatus is restricted.

For example, a digital VCR that can deal with the following 4:2:2 component digital video signal will be considered.

Effective picture size: 720 samples×512 lines
Frame frequency: 29.97 Hz
Scanning system: Interlaced
Editing: Frame editing and picture search
Profile: 4:2:2 P or less
Bit rate: 50 Mbps or less In this case, the format of the input MPEG ES should satisfy the following conditions.

(1) vertical_size=512 (512 lines/frame)
(2) horizontal_size=720 (720 samples/line)
(3) frame_rate_code=4 (29.97 Hz)
(4) frame_rate_extension_n=0
(5) frame_rate_extension_d=0
(6) progressive_sequence=0 (Interlaced)
(7) progressive_frame=0 (Interlaced)
(8) chroma_format=2(4:2:2)
(9) picture_coding_type=1 (I-picture)
(10) profile_and_level_indication=MP@ML or 422@ML
(11) low_delay=1
(12) concealment_motion_vectors=0
(13) chroma_420 type=0 (because of 4:2:2)
(14) f_code=15 (because of I picture)

In addition, a bit rate of 50 Mbps and non-scalability are required.

In addition, a more effective format may be selected at high rate as follows.

(15) q_scale_type=1
(16) intra_vlc_format=1

When a stream that does not satisfy such conditions is output, a situation described in the Background section may take place.

Figure 27:
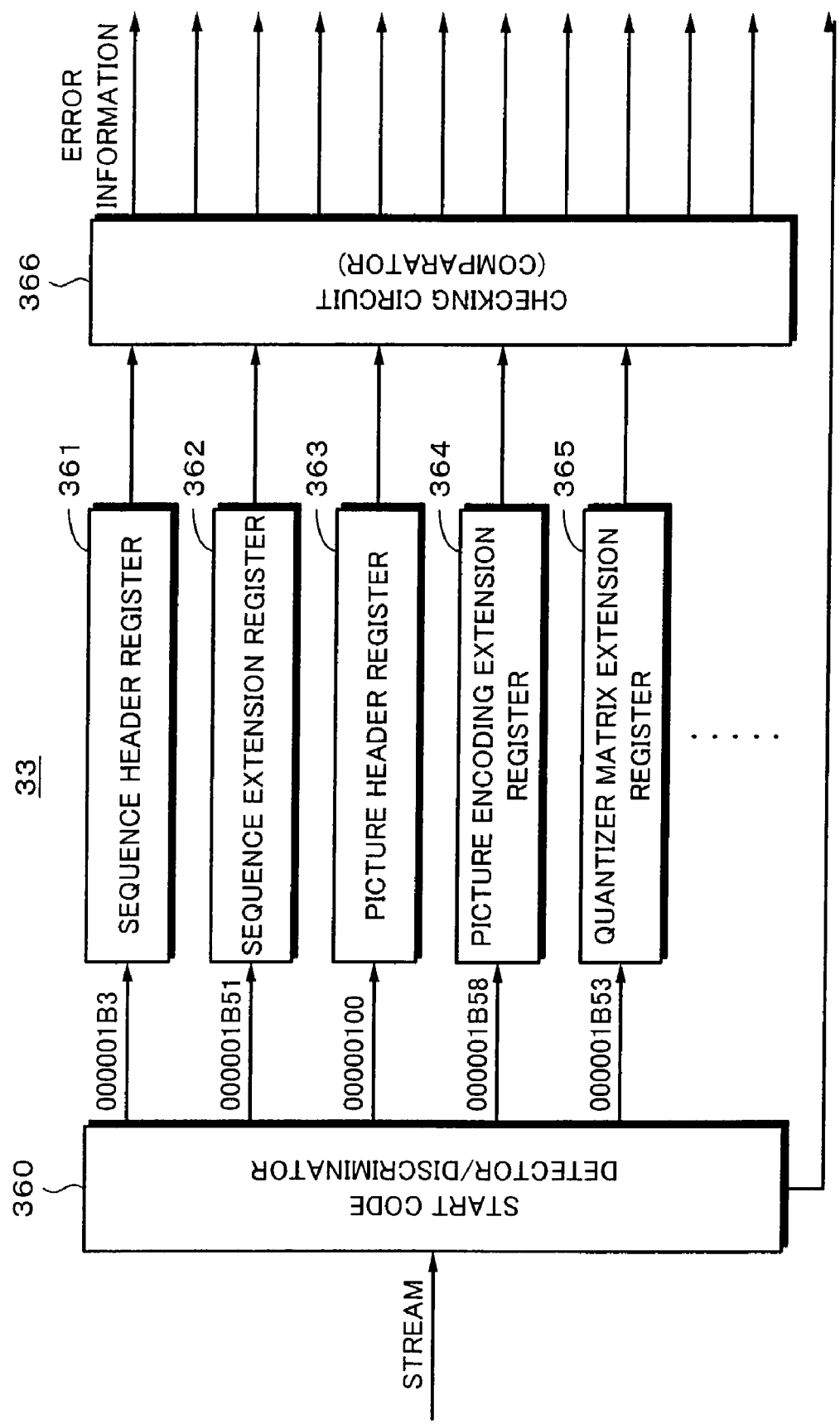
FIG. 27 is a block diagram showing the structure of an example of a format checker.

FIG. 27 shows the structure of an example of the format checker 331 that extracts header information from an MPEG ES and detects a format violation therefrom. The MPEG ES is input to the format checker 331. The input MPEG ES is supplied to a start code detector/discriminator 360. The start code detector/discriminator 360 detects a start code by a bit pattern matching process and discriminates each header. Thereafter, the start code detector/discriminator 360 extracts a predetermined amount of data preceded by the start code.

The format checker 331 extracts at least the following data excluding a start header from each header.

Sequence header 2: 8 bytes
Sequence extension 3: 6 bytes

Picture header 9: 4 bytes
Picture encoding extension: 5 bytes
The extracted data is stored in registers 361, 362, 363, and 364.

It is preferred to check the quantizer matrix for more accurate determination. To do that, more 128 bytes are extracted from the sequence header 2. In addition, 257 bytes is extracted from the quantizer matrix extension. These extracted data is stored in a register 365.

To check the scalability, another extension may be extracted.

Parameter values stored in the registers 361 to 365 are supplied to a checking circuit 366. The checking circuit 366 has for example a register (not shown) that has stored values that have been designated corresponding to the parameters. The checking circuit 366 is a comparator that compares parameter values supplied from the registers 361 to 365 with the values stored in the register of the checking circuit 366. When the compared result represents that the parameter value stored in each of the registers 361 to 365 does not match the corresponding parameter value stored in the register of the checking circuit 366, it is determined that the stream contains a format violation.

The syntax checker 330 and the format checker 331 can be accomplished by a common structure.

In the forgoing structure, when the MPEG ES supplied to the error checker 530 contains a syntax error or a format violation, the syntax checker 330 and the format checker 331 of the checker 530A detect them. Corresponding to the detected results, the switch circuit 530B is placed in the close state. As a result, the output of the MPEG ES is stopped. The output of the MPEG ES is stopped in one of the following two methods.

(1) When a GOP contains a syntax error or a format violation, a GOP that is immediately followed thereby is fully output. At the end of the GOP that has been fully output, sequence_end_code is added. As a result, the remaining stream including the GOP that contains the syntax error or format violation is erased. In other words, the process is performed in the unit of a GOP.

(2) When a picture contains a syntax error or a format violation, a picture that is immediately followed thereby is fully output. At the end of the picture that has been fully output, sequence_end_code is added. As a result, the remaining stream including the picture that contains the syntax error or format violation is erased. In other words, the process is performed in the unit of a picture.

For easy understanding, with reference to FIGS. 28A and 28B, the order of pictures of an MPEG stream will be described in brief. In FIGS. 28A and 28B, an arrow mark directed from one picture to another picture represents that each picture is encoded using a picture with an arrow mark. FIG. 28A shows a display order of pictures. In the example, a picture pic5 that is a P picture is predicted using a picture pic2 that is an I picture. On the other hand, a picture pic3 and a picture pic4 that are B pictures are predicted using pictures pic2 and pic5. For example, the pictures in the display order shown in FIG. 28A are transmitted in the order shown in FIG. 28B. In other words, an I picture is chronologically followed by a B picture that is predicted using the I picture. Likewise, a P picture is chronologically followed by a B picture that is predicted using the P picture.

FIGS. 29A, 29B, and 29C show the orders of pictures in the case that the beginning of a GOP is encoded and decoded. As shown in FIG. 29A, before the beginning of the GOP is encoded, $B_1$ picture, $B_2$ picture, $I_3$ picture, $B_4$ picture, $B_5$ picture, and $P_6$ picture are placed in the order. For example, the $B_4$ picture is predicted using the $I_3$ picture and the $P_6$ picture. When these pictures are encoded corresponding to the MPEG system and transmitted, as shown in FIG. 29B, the $B_4$ picture and the $B_5$ picture that are predicted using the $I_3$ picture and the $P_6$ picture are preceded by the $P_6$ picture. When the beginning of the GOP is decoded, the $B_1$ picture and the $B_2$ picture are predicted using the $I_3$ picture and another P picture (not shown). When the beginning of the GOP is displayed, as shown in FIG. 29C, the $B_1$ picture and the $B_2$ picture are followed by the $I_3$ picture.

Figures 30A, 30B:
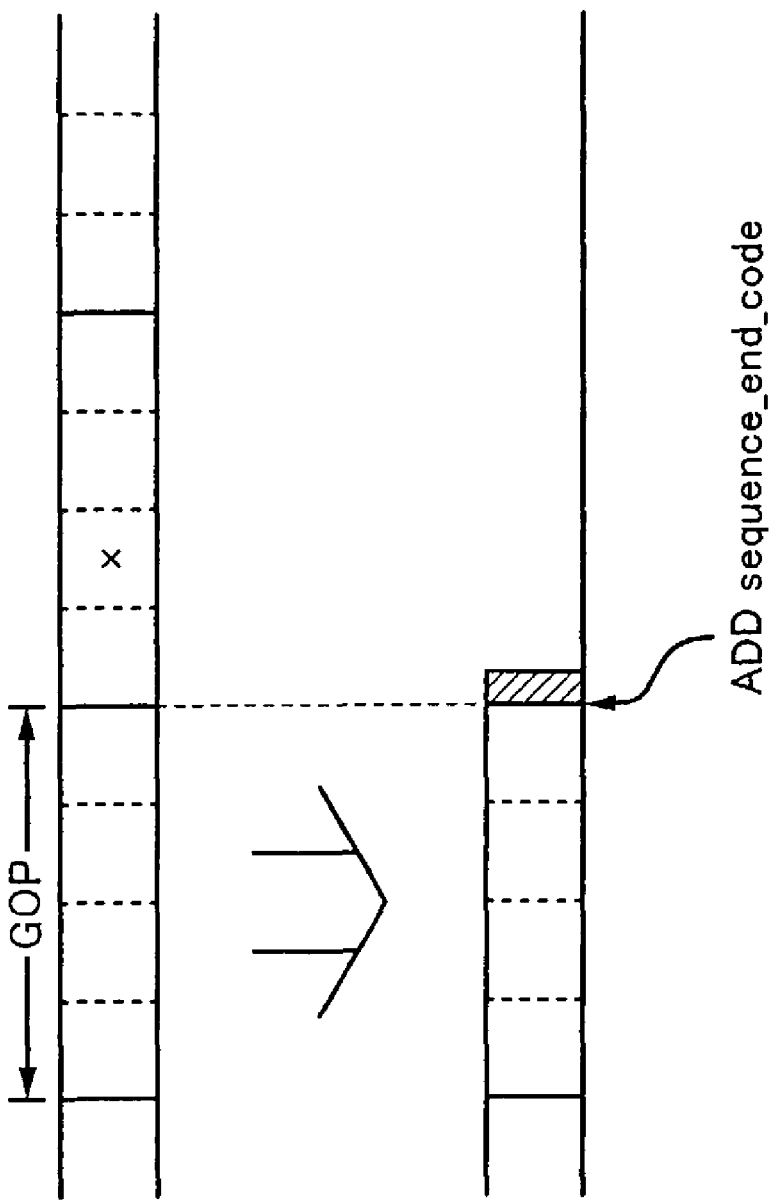
FIGS. 30A and 30B are schematic diagrams for explaining the case that a process is performed in the unit of a GOP.

Next, streams in the case that the output stopping method (1) and output stopping method (2) are executed for an MPEG ES in the forgoing picture order will be described. First, the case that the output stopping method (1) of which the process is performed in the unit of a GOP will be described. In this case, as shown in FIG. 30A, when a particular picture of a particular GOP of a stream (this picture is denoted by "X" in FIG. 30A) contains a syntax error or a format violation, as shown in FIG. 30B, all the GOP containing the picture is erased. At the end of a GOP that is immediately followed by the particular GOP, sequence_end_code is added.

Figures 31A, 31B, 31C:
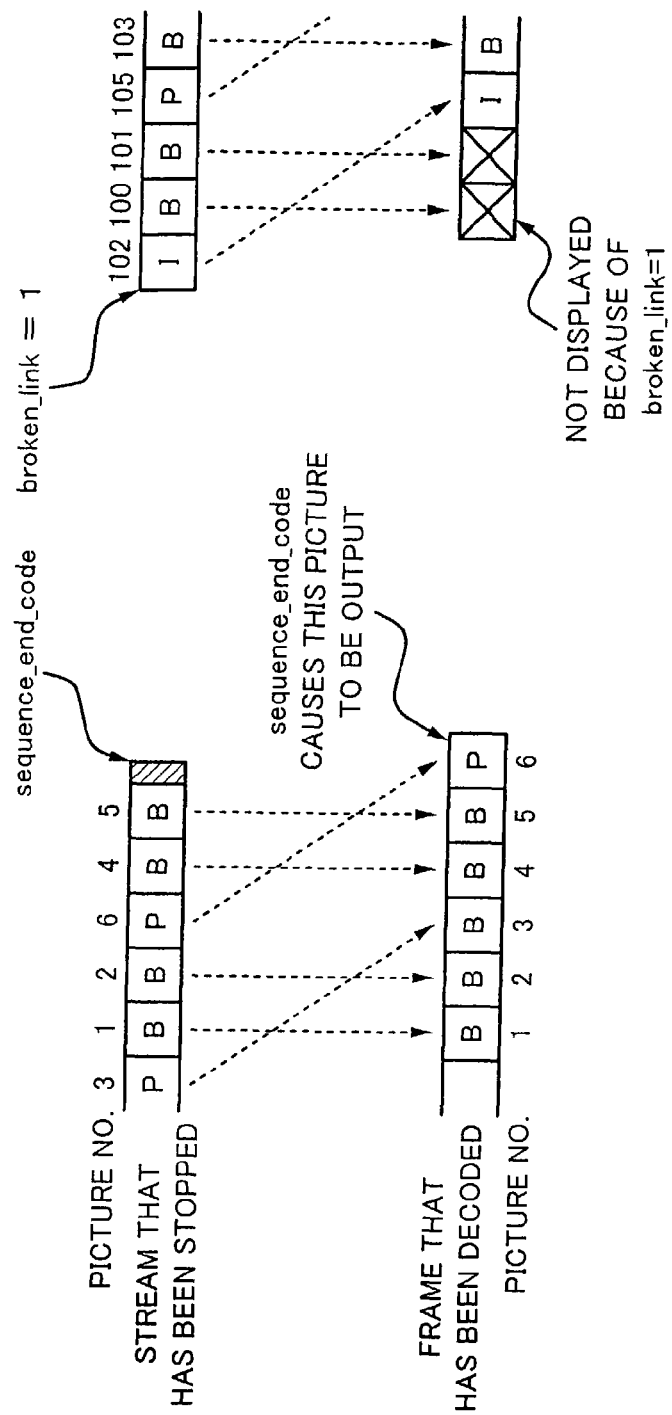
FIGS. 31A, 31B, and 31C are schematic diagrams showing an example of the case that a process is performed in the unit of a GOP.

The MPEG standard prescribes that the first picture of a GOP of an MPEG ES is an I picture. Thus, when the process is performed in the unit of a GOP, the MPEG ES is broken with an I picture. FIGS. 31A, 31B, and 31C show a detailed example of the case that the process is performed in the unit of a GOP as the output stopping method (1). In FIGS. 31A, 31B, 31C, 33A, 33B, 33C, 34A, 34B, and 34C, vertical lines represent delimitations of pictures, whereas codes placed on pictures represent picture display order numbers. In the following description, each picture is identified with display order such as "X-th picture".

As shown in FIG. 31A, in a stream that is checked by the error checker 530, at the beginning of an I picture, two GOP are delimited. When a ninth picture that is an I picture contains a syntax error or a format violation, as shown in FIG. 31B, the stream is stopped immediately before the ninth picture. The remaining stream including the GOP to which the ninth picture that contains the syntax error or format violation belongs is erased.

After the output of a stream is stopped, the error checker 530 continuously checks an MPEG ES. When the error checker 530 has detected a correct stream, a stream is resumed from the beginning of a GOP that is immediately preceded by the correct stream. In the example shown in FIGS. 31A, 31B, and 31C, a stream is resumed from a 102-nd picture that is an I picture (see FIG. 31C).

sequence_end_code that represents the end of a sequence is added immediately before the stop position of the stream. When the stream is decoded by an MPEG decoder or the like, as shown in FIG. 31C, the added sequence_end_code causes data stored in a buffer (not shown) to be output. A P picture as a sixth picture is output after B pictures as a fourth picture and a fifth picture. As a result, the pictures are rearranged in the correct display order.

After a stream has been resumed, when it is decoded, pictures are rearranged in the display order so that an I picture as a 102-th picture is preceded by B pictures as a 100-th picture and a 101-st picture. Since a B picture is predicted using two pictures that are immediately preceded and followed by the B picture, the B picture cannot be accurately reproduced. Thus, when the stream is resumed, the error checker 530 sets the value of broken_link to "1" that represents that the B picture at the beginning of the GOP is invalid. Thus, when the MPEG decoder or the like decodes the stream, B pictures as the 100-th picture and the 101-st picture are not displayed. The MPEG2 standard prescribes that when the value of broken_link is "1", a decoder causes a corresponding picture not be displayed.

Next, the case that the process is performed in the unit of a picture as the output stopping method (2) will be described. In this case, as shown in FIG. 32A, when a picture of a GOP (this picture is denoted by "X" in FIG. 32A) contains a syntax error or a format violation, as shown in FIG. 32B, the stream is erased from the picture that contains the syntax error or format violation until the beginning of the first GOP of a stream that is resumed. sequence_end_code is added at the end of the picture immediately preceded by the picture that contains the syntax error or format violation.

When the process is performed in the unit of a picture, depending on the position at which a picture contains a syntax error or a format violation, the picture may be lost. If an I picture or a P picture contains a syntax error or a format violation, when the picture is reproduced, the reproduced picture is not lost. In contrast, if a B picture contains a syntax error or a format violation, when the picture is reproduced, the reproduced picture is lost.

When an I picture contains a syntax error or a format violation, the stream is erased from the I picture. Substantially, the same process as the output stopping method (1) in which the process is performed in the unit of a GOP is performed.

FIGS. 33A and 33B show an example of the case that a P picture contains a syntax error or a format violation. As shown in FIG. 33A, when a twelfth picture that is a P picture of a stream contains a syntax error or a format violation, as shown in FIG. 33B, the stream is erased from the twelfth picture that is a P picture. sequence_end_code is added to the eighth picture immediately followed by the twelfth picture. When the stream is resumed, the value of broken_link of the GOP header 6 at the beginning of the resumed stream is set to "1" that represents that the B picture at the beginning of the GOP is not valid.

After the stream is decoded by an MPEG decoder or the like, as shown in FIG. 33C, the added sequence_end_code causes data stored in the buffer to be output. As a result, a ninth picture that is an I picture is output after a seventh picture and an eighth picture that are B pictures. Thus, pictures are rearranged in the correct display order. On the other hand, after the stream is resumed, the value of broken_link is set to "1" that represents that the two B pictures at the beginning of the first GOP of the resumed stream are not valid. As a result, when the stream is decoded by an MPEG decoder or the like, a 100-th picture and a 101-st picture that are B pictures are not displayed.

Figures 34A, 34B, 34C:
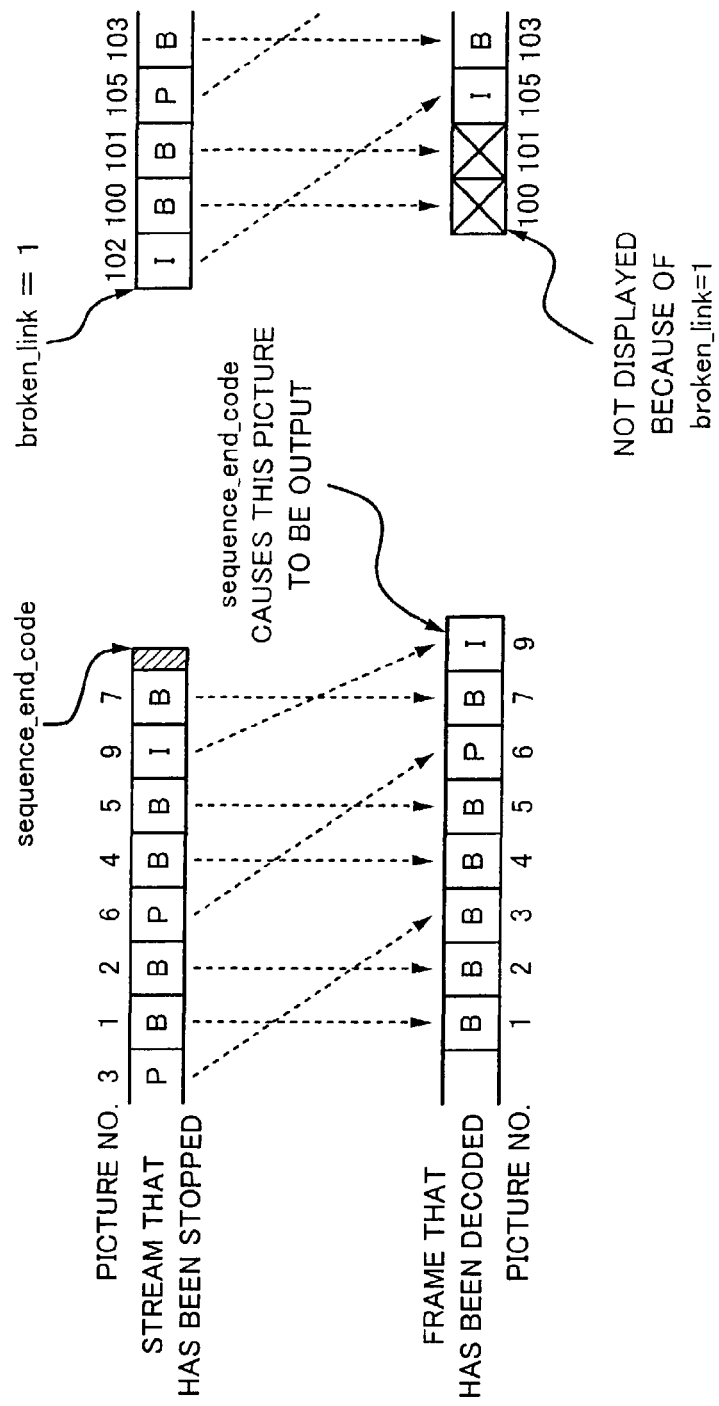
FIGS. 34A, 34B, and 34C are schematic diagrams showing an example of the case that a B picture contains a syntax error or a format violation.

FIGS. 34A, 34B, and 34C show an example of the case that a B picture contains a syntax error or a format violation. When an eighth picture that is a B picture of a stream shown in FIG. 34A contains a syntax error or a format violation, as shown in FIG. 34B, the stream is erased from the eighth picture as a B picture. sequence_end_code is added to a seventh picture immediately followed by the eighth picture. When the stream is resumed, the value of broken_link of the GOP header 6 at the beginning of the resumed stream is set to "1" that represents that the B picture at the beginning of the GOP is not valid.

After the stream is decoded by the MPEG decoder or the like, as shown in FIG. 34C, the added sequence_end_code causes data stored in the buffer to be output. As a result, a ninth picture that is an I picture is output after the seventh picture that is a B picture. In the example shown in FIGS. 34A, 34B, and 34C, as was described above, when the stream is stopped, the eighth picture that is a B picture that contains a syntax error or a format violation is erased. Thus, after the stream is decoded, one of two B pictures placed between the sixth picture that is a P picture and the ninth picture that is an I picture is lost.

In each of the forgoing examples, when the value of closed_gop of the GOP header 6 is "1", since the beginning B picture is encoded using a picture in the same GOP, it is not necessary to set the value of broken_link to "1".

Figure 35A:
FIGS. 35A and 35B are schematic diagrams for explaining an enable signal EN.
Figure 35B:
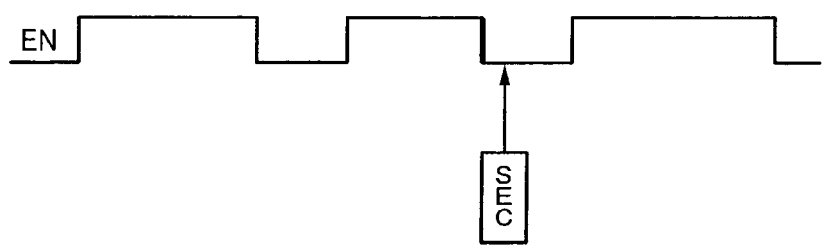

Next, a method for adding sequence_end_code will be described. As was described above, the SDTI receiving portion 108 and the reproduction side MFC 114 output an enable signal EN that represents a valid region of a stream that is output. As shown in FIG. 35A, for a stream that is output as a burst in the unit of a picture, as shown in FIG. 35B, in the output period of the stream, the enable signal EN becomes for example "H" state. When the trailing position of the enable signal EN is detected, the end of a picture can be detected. Corresponding to the position of the end of the picture, sequence_end_code can be added.

Figure 36:
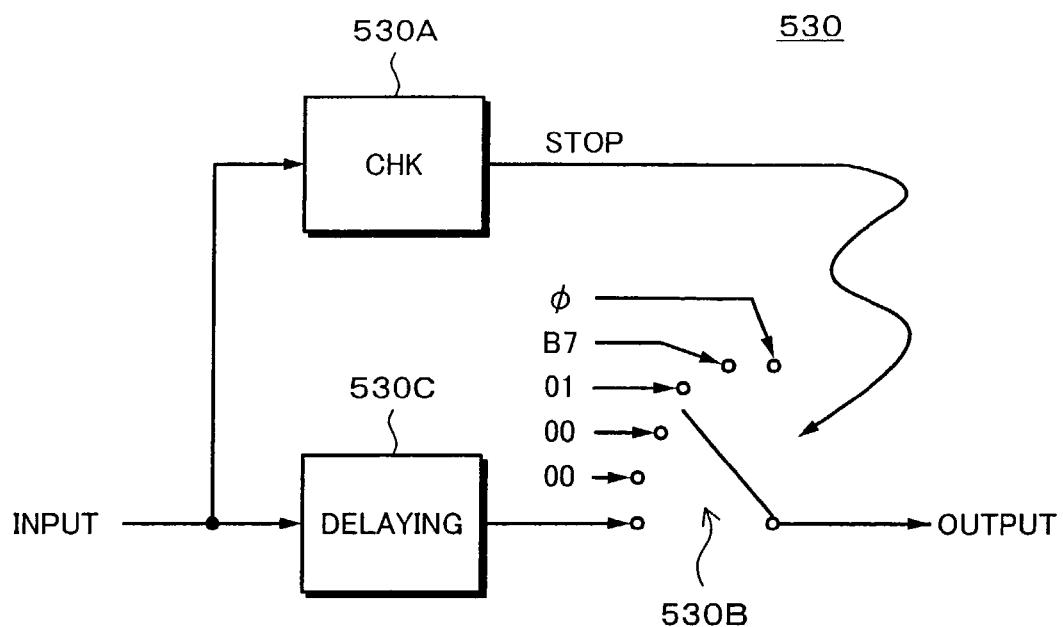
FIG. 36 is a block diagram showing the structure of an example of an error checker that adds sequence_end_code.

FIG. 36 shows the structure of an example of the error checker 530 that adds sequence_end_code to a stream. An MPEG ES is supplied to the error checker 530. Thereafter, the MPEG ES is supplied to the checker 530A. In addition, the MPEG ES is supplied to a delaying circuit 530C. The checker 530A has for example the forgoing syntax checker 330 and format checker 331. The logical sum of the checked results of the syntax checker 330 and the format checker 331 is output as the checked result of the checker 530A. In addition, the checker 530A checks the MPEG ES while the signal state thereof is in "H" level.

When the process is performed in the unit of a picture as the signal outputting method (2), if the checked picture contains a syntax error or a format violation, sequence_end_code is added to the end of a picture immediately followed by the checked picture.

For example, a picture immediately followed by a picture that contains a syntax error or a format violation is output from the delaying circuit 530C. The output picture is supplied to a switch circuit 530B. The checker 530A controls the switch circuit 530B so that a code [00 00 01 B7] that represents sequence_end_code is added to the end of the stream that is output from the delaying circuit 530C at intervals of eight bits.

When sequence_end_code is added, the switch circuit 530B is controlled so that the output of pictures that are supplied from the delaying circuit 530C is stopped. In the example shown in FIG. 36, the checker 530A selects a terminal "φ" of the switch circuit 530B. As a result, a non-signal output state takes place.

Figure 37:
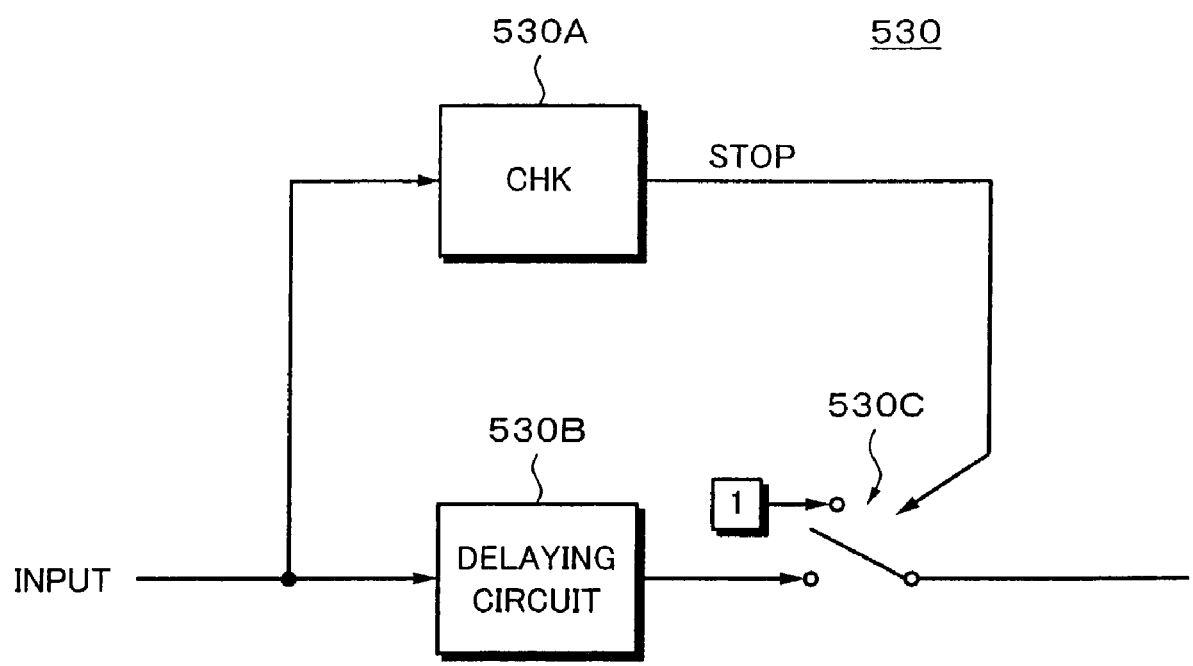
FIG. 37 is a block diagram showing the structure of an example of an error checker that designates broken_link.

As was described above, when a normal stream is resumed, the value of broken_link of the header of the next GOP is set to "1". Next, with reference to FIGS. 37, 38A, and 38B, a method for setting the value of broken_link will be described. FIG. 37 shows the structure of an example of the error checker 530 that sets the value of broken_link.

After a stream is stopped, when the checker 530A does not detect a syntax error or a format violation in an MPEG ES that is input to the error checker 530, the checker 530A controls the delaying circuit 530C so as to resume the output of the stream. For example, as shown in FIG. 38A, the input MPEG ES is delayed by a delaying circuit 530B at a timing based on the enable signal EN. As shown in FIG. 38B, the delayed MPEG ES is output from the delaying circuit 530B.

A code that represents the beginning of a GOP header GOH is [00 00 01 B8]. broken_link is placed 27-th bit after the start code (see FIG. 38B). Thus, when the checker 530A has detected a GOP start code, the switch circuit 530C is controlled so that the value of the 27-th bit after the end of the start code is replaced with "1".

The circuit shown in FIG. 36 and the circuit shown in FIG. 37 can be accomplished by a common structure. In addition, timings of the circuits shown in FIGS. 36 and 37 are controlled corresponding to the enable signal EN that is output from the SDTI receiving portion 108 or the reproduction side MFC 114.

When such an MPEG ES checking mechanism is disposed downstream of the switch circuit 532, regardless of input monitor state (namely, the state that EE path is enabled) or reproduction state (namely, the state that MPEG ES that has been reproduced from the magnetic tape 112 can be output), an invalid stream can be prevented from being output to the outside of the apparatus. In addition, an error that may take place upon switching between the input monitor state and the reproduction state can be handled.

Even if the error checker 530 requires a time to check an output stream, when the input stream is buffered in a memory, the record stopping process can be properly delayed corresponding to the operation of the error checker 530.

In the forgoing example, a stream that has been compressed and encoded corresponding to the MPEG system was described. However, the present invention can be applied to apparatuses that output streams that have been compressed and encoded corresponding to other systems.

In addition, in the forgoing example, a recording and reproducing apparatus that records an MPEG ES to a record medium was described. However, the present invention can be applied to video and audio apparatuses that deal with streams that have been compressed and encoded as well as such a recording and reproducing apparatus.

In addition, the forgoing example was described assuming that the record medium is a magnetic tape. However, the present invention can be also applied to a disc shaped record medium such as an MO (Magneto-Optical) disc.

In addition, the forgoing example was described assuming that the present invention is applied to a recording and reproducing apparatus that deals with a stream of which a video signal has been compressed and encoded. However, the theory of the present invention can be applied to an audio recording apparatus using an audio compression technology such as AC-3 (Audio Code Number 3), AAC (Advanced Audio Coding), dts (Digital Theater Systems), or ATRAC (Adaptive Transform Acoustic Coding).

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A signal processing apparatus for outputting an encoded stream to an external source, said signal processing apparatus comprising:
   storing means for storing a plurality of data;
   output means for outputting an encoded stream to the external source;
   extracting means for extracting a parameter with respect to an encoding of the encoded stream from the encoded stream supplied to the output means;
   determining means for determining whether or not the parameter extracted by the extracting means is an invalid parameter by comparing a value of the extracted parameter with an interdiction value or a reserved value pre-stored in the determining means and comparing the data length of the extracted parameter with a predetermined length range; and
   output stopping means for causing the output means to stop outputting the encoded stream when the determined result of the determining means represents that the parameter is an invalid parameter;
   wherein the extracting means further extracts a plurality of parameters with respect to the encoding of the encoded stream from the encoded stream and the determining means further determines whether a sequence of the plurality of parameters matches a predetermined sequence,
   wherein the determining means determines the extracted parameter as an invalid parameter when the data length of the extracted parameter is shorter than the predetermined length range,
   wherein the determining means determines a first parameter as an invalid parameter when a restriction between the first parameter and a second parameter is voilated,
   wherein the determining means determines the extracted parameters further based on a restrictive relationship among extracted parameters, and
   wherein when the encoded stream contains a syntax error or a format violation,
      a predetermined code is added to the stream,
      a portion of the encoded stream which contains the syntax error or format violation is erased, and
      outputting is resumed from the beginning of a portion that is immediately preceded by a next detected correct stream following the deleted portion.

2. The signal processing apparatus as set forth in claim 1, wherein the extracting means partly decodes the encoded stream and extracts the parameter from the partly decoded stream.

3. The signal processing apparatus as set forth in claim 1, wherein when the parameter includes a syntax error, the determining means determines that the parameter is the invalid parameter.

4. The signal processing apparatus as set forth in claim 1, wherein when the parameter includes a format violation, the determining means determines that the parameter is the invalid parameter.

5. The signal processing apparatus as set forth in claim 1, wherein when the output stopping means stops outputting the encoded stream, a code representing the end of the stream being added to the end of a stream immediately followed thereby.

6. The signal processing apparatus as set forth in claim 5, wherein when the output of the stream stopped by the output stopping means is resumed, a code representing existence of data which will not be used because of the stop of the output is added to the resumed stream.

7. A signal processing method of a signal processing apparatus for outputting an encoded stream to an external source, said signal processing method comprising the steps of:
   storing a plurality of data via a storing means;
   extracting a parameter with respect to an encoding of the encoded stream from an encoded stream that are output and supplied;
   determining whether or not the parameter extracted at the extracting step is an invalid parameter by comparing a value of the extracted parameter with an interdiction value or a reserved value and comparing the data length of the extracted parameter with a predetermined length range; and causing the output of the encoded stream to be stopped when the determined result at the determining step represents that the parameter is an invalid parameter;

wherein the extracting step further extracts a plurality of parameters with respect to the encoding of the encoded stream from the encoded stream and the determining step further determines whether a sequence of the plurality of parameters matches a predetermined sequence, wherein the determining step determines the extracted parameter as an invalid parameter when the data length of the extracted parameter is shorter than the predetermined length range, wherein the determining step determines a first parameter as an invalid parameter when a restriction between the first parameter and a second parameter is violated, wherein the determining step determines the extracted parameters further based on a restrictive relationship among extracted parameters, and wherein when the encoded stream contains a syntax error or a format violation,
a predetermined code is added to the stream,
a portion of the encoded stream which contains the syntax error or format violation is erased, and
outputting is resumed from the beginning of a portion that is immediately preceded by a next detected correct stream following the deleted portion.

8. A recording and reproducing apparatus for recording an input stream encoded from an external source to a record medium and for outputting an encoded stream reproduced from the record medium to the external source, said recording and reproducing apparatus comprising:

input means for inputting a stream encoded from the external source;

recording means for recording the encoded stream input to the input means to the record medium;

reproducing means for reproducing the encoded stream from the record medium;

storing means for storing a plurality of data via a storing means;

output means for outputting the encoded stream reproduced by the reproducing means to the external source;

extracting means for extracting a parameter with respect to an encoding of the encoded stream from the encoded stream supplied to the output means;

determining means for determining whether or not the parameter extracted by the extracting means is an invalid parameter by comparing a value of the extracted parameter with all interdiction value or a reserved value prestored in the determining means and comparing the data length of the extracted parameter with a predetermined length range; and output stopping means for causing the output means to stop outputting the encoded stream when the determined result of the determining means represents that the parameter is an invalid parameter;

wherein the extracting means further extracts a plurality of parameters with respect to the encoding of the encoded stream from the encoded stream and the determining means further determines whether a sequence of the plurality of parameters matches a predetermined sequence, wherein the determining means determines the extracted parameter as an invalid parameter when the data length of the extracted parameter is shorter than the predetermined length range, wherein the determining step determines a first parameter as an invalid parameter when a restriction between the first parameter and a sedond parameter is violated, wherein the determining means determines the extracted parameters further based on a restrictive relationship among extracted parameters, and wherein when the encoded stream contains a syntax error or a format violation,
a predetermined code is added to the stream,
a portion of the encoded stream which contains the syntax error or format violation is erased, and
outputting is resumed from the beginning of a portion that is immediately preceded by a next detected correct stream following the deleted portion.

9. The recording and reproducing apparatus as set forth in claim 8,
wherein the extracting means partly decodes the encoded stream and extracts the parameter from the partly decoded stream.

10. The recording and reproducing apparatus as set forth in claim 8,
wherein when the parameter includes a syntax error, the determining means determines that the parameter is the invalid parameter.

11. The recording and reproducing apparatus as set forth in claim 8,
wherein when the parameter includes a format violation, the determining means determines that the parameter is the invalid parameter.

12. The recording and reproducing apparatus as set forth in claim 8,
wherein when the output stopping means stops outputting the encoded stream, a code representing the end of the stream being added to the end of a stream immediately followed thereby.

13. The recording and reproducing apparatus as set forth in claim 12,
wherein when the output of the stream stopped by the output stopping means is resumed, a code representing existence of data which will not be used because of the stop of the output is added to the resumed stream.

14. The recording and reproducing apparatus as set forth in claim 8, further comprising:
input monitoring means for directly supplying the encoded stream that has been input from the input means to the output means,
wherein the extracting means extracts the parameter with respect to the encoding of the encoded stream from the encoded stream supplied to the output means through the input monitoring means, the determining means determines whether or not the extracted parameter is an invalid parameter, and when the determined result represents that the parameter is an invalid parameter, the output stopping means stops outputting the encoded stream.

15. A reproducing apparatus that reproduces an encoded stream from a record medium and outputs the reproduced encoded stream to an external apparatus, said reproducing apparatus comprising:

reproducing means for reproducing an encoded stream from a record medium;

storing means for storing a plurality of data via a storing means;

output means for outputting the encoded stream reproduced by the reproducing means to the external source;

extracting means for extracting a parameter with respect to an encoding of the encoded stream from the encoded stream supplied to the output means;

determining means for determining whether or not the parameter extracted by the extracting means is an invalid parameter by comparing a value of the extracted parameter with an interdiction value or a reserved value pre-stored in the determining means and comparing the data length of the extracted parameter with a predetermined length range; and output stopping means for causing the output means to stop outputting the encoded stream when the determined result of the determining means represents that the parameter is an invalid parameter;

wherein the extracting means further extracts a plurality of parameters with respect to the encoding of the encoded stream from the encoded stream and the determining means further determines whether a sequence of the plurality of parameters matches a predetermined sequence, wherein the determining means determines the extracted parameter as an invalid parameter when the data length of the extracted parameter is shorter than the predetermined length range, wherein the determining means determines a first parameter as an invalid Parameter when a restriction between the first parameter and a second parameter is violated, wherein the determining means determines the extracted parameters further based on a restrictive relationship among extracted parameters, and wherein when the encoded stream contains a syntax error or a format violation,
  a predetermined code is added to the stream,
  a portion of the encoded stream which contains the syntax error or format violation is erased, and
  outputting is resumed from the beginning of a portion that is immediately preceded by a next detected correct stream following the deleted portion.

16. The reproducing apparatus as set forth in claim 15, wherein the extracting means partly decodes the encoded stream and extracts the parameter from the partly decoded stream.

17. The reproducing apparatus as set forth in claim 15, wherein when the parameter includes a syntax error, the determining means determines that the parameter is the invalid parameter.

18. The reproducing apparatus as set forth in claim 15, wherein when the parameter includes a format violation, the determining means determines that the parameter is the invalid parameter.

19. The reproducing apparatus as set forth in claim 15, wherein when the output stopping means stops outputting the encoded stream, a code representing the end of the stream being added to the end of a stream immediately followed thereby.

20. The reproducing apparatus as set forth in claim 19, wherein when the output of the stream stopped by the output stopping means is resumed, a code representing existence of data which will not be used because of the stop of the output is added to the resumed stream.

21. A reproducing method of a reproducing apparatus for reproducing an encoded stream from a record medium and outputting the reproduced encoded stream to an external source, said reproducing method comprising the steps of:

storing a plurality of data via a storing means;

reproducing an encoded stream from a record medium;

extracting a parameter with respect to an encoding of the encoded stream from the encoded stream that has been reproduced;

determining whether or not the parameter extracted at the extracting step is an invalid parameter by comparing a value of the extracted parameter with an interdiction value or a reserved value and comparing the data length of the extracted parameter with a predetermined length range; and causing the output of the encoded stream to be stopped when the determined result at the determining step represents that the parameter is an invalid parameter;

wherein the extracting step further extracts a plurality of parameters with respect to the encoding of the encoded stream from the encoded stream and the determining step further determines whether a sequence of the plurality of parameters matches a predetermined sequence, wherein the determining step determines the extracted parameter as an invalid parameter when the data length of the extracted parameter is shorter than the predetermined length range, wherein the determining step determines a first parameter as an invalid parameter when a restriction between the first parameter and a second parameter is violated, wherein the determining step determines the extracted parameters further based on a restrictive relationship among extracted parameters, wherein when the encoded stream contains a syntax error or a format violation,
  a predetermined code is added to the stream,
  a portion of the encoded stream which contains the syntax error or format violation is erased, and
  outputting is resumed from the beginning of a portion that is immediately preceded by a next detected correct stream following the deleted portion.

* * * * *